United States Patent
Macaluso

(10) Patent No.: US 11,626,775 B2
(45) Date of Patent: Apr. 11, 2023

(54) POWER GENERATION FROM VEHICLE WHEEL ROTATION

(71) Applicant: Anthony Macaluso, San Diego, CA (US)

(72) Inventor: Anthony Macaluso, San Diego, CA (US)

(*) Notice: Subject to any disclaimer, the term of this patent is extended or adjusted under 35 U.S.C. 154(b) by 0 days.

(21) Appl. No.: 17/869,252

(22) Filed: Jul. 20, 2022

(65) Prior Publication Data

US 2022/0360141 A1    Nov. 10, 2022

Related U.S. Application Data

(63) Continuation of application No. 17/699,694, filed on Mar. 21, 2022, now Pat. No. 11,431,225, which is a continuation of application No. 17/410,272, filed on Aug. 24, 2021, now Pat. No. 11,289,974, which is a continuation-in-part of application No. 17/332,824, filed on May 27, 2021, which is a continuation-in-part of application No. 17/141,518, filed on Jan. 5, 2021, now Pat. No. 11,133,729, which is a continuation-in-part of application No. 16/847,538, filed on Apr. 13, 2020.

(Continued)

(51) Int. Cl.
*H02K 7/18* (2006.01)
*F16D 1/06* (2006.01)
*H02K 7/00* (2006.01)

(52) U.S. Cl.
CPC .............. *H02K 7/1861* (2013.01); *F16D 1/06* (2013.01); *H02K 7/003* (2013.01)

(58) Field of Classification Search
CPC .......... H02K 7/003; H02K 7/1861; F16D 1/06
See application file for complete search history.

(56) References Cited

U.S. PATENT DOCUMENTS

| 2,451,965 A | 10/1948 | Longenecker |
| 2,660,443 A | 11/1953 | Miller |

(Continued)

FOREIGN PATENT DOCUMENTS

| CH | 202100372 | 4/2022 |
| CN | 107804326 | 1/2020 |

(Continued)

*Primary Examiner* — Tulsidas C Patel
*Assistant Examiner* — Thomas K Quigley
(74) *Attorney, Agent, or Firm* — Knobbe, Martens, Olson & Bear, LLP

(57) ABSTRACT

The disclosure is directed to an apparatus for generating energy in response to a vehicle wheel rotation. The apparatus may include a first roller comprising a curved roller surface configured to be positioned in substantial physical contact with a first wheel of the vehicle. The first roller may be configured to rotate in response to a rotation of the first wheel. The apparatus may further include a first shaft rotatably couplable to the first roller such that rotation of the first roller causes the first shaft to rotate. The apparatus may further include a first generator operably coupled to the first shaft. The generator may be configured to generate an electrical output based on the rotation of the first shaft and convey the electrical output to an energy storage device or to a motor of the vehicle that converts electrical energy to mechanical energy to rotate one or more wheels of the vehicle.

22 Claims, 28 Drawing Sheets

Related U.S. Application Data

(60) Provisional application No. 63/164,474, filed on Mar. 22, 2021, provisional application No. 63/140,805, filed on Jan. 23, 2021, provisional application No. 62/967,406, filed on Jan. 29, 2020, provisional application No. 62/883,523, filed on Aug. 6, 2019, provisional application No. 62/858,902, filed on Jun. 7, 2019.

(56) References Cited

U.S. PATENT DOCUMENTS

| | | | |
|---|---|---|---|
| 3,859,589 A * | 1/1975 | Rush | H02K 7/1861 |
| | | | 307/64 |
| 3,891,044 A | 6/1975 | Tiede | |
| 3,943,370 A * | 3/1976 | Watanabe | H02K 7/1861 |
| | | | 290/1 R |
| 3,961,678 A | 6/1976 | Hirano et al. | |
| 3,978,936 A | 9/1976 | Schwartz | |
| 4,214,160 A | 7/1980 | Fies et al. | |
| 4,314,160 A | 2/1982 | Boodman et al. | |
| 4,364,448 A | 12/1982 | Ikuma | |
| 4,476,947 A | 10/1984 | Rynbrandt | |
| 4,579,188 A | 4/1986 | Facer | |
| 5,045,646 A | 9/1991 | Musachio | |
| 5,078,227 A | 1/1992 | Becker | |
| 5,086,857 A * | 2/1992 | Dale | H02K 7/1861 |
| | | | 180/53.61 |
| 5,105,776 A | 4/1992 | Tsuchiya | |
| 5,316,101 A | 5/1994 | Gannon | |
| 5,412,293 A | 5/1995 | Minezawa et al. | |
| 5,491,390 A | 2/1996 | McGreen | |
| 5,671,821 A | 9/1997 | McGreen | |
| 5,680,907 A | 10/1997 | Weihe | |
| 5,735,363 A | 4/1998 | Horovitz et al. | |
| 5,767,663 A | 6/1998 | Lu | |
| 5,921,334 A | 7/1999 | Al-Dokhi | |
| 5,992,553 A | 11/1999 | Morrison | |
| 6,065,557 A | 5/2000 | von Keyserling | |
| 6,220,381 B1 | 4/2001 | Damron et al. | |
| 6,390,215 B1 | 5/2002 | Kodama | |
| 6,502,842 B2 | 1/2003 | Ko | |
| 6,531,838 B2 | 3/2003 | Parks | |
| 6,703,716 B2 | 3/2004 | Chiu | |
| 6,717,280 B1 * | 4/2004 | Bienville | B62M 6/90 |
| | | | 290/1 R |
| 6,987,327 B1 | 1/2006 | Lucatero | |
| 7,183,746 B1 | 2/2007 | Carter | |
| 7,279,799 B1 * | 10/2007 | McCauley | H02K 7/1861 |
| | | | 290/1 R |
| 7,514,803 B2 | 4/2009 | Wilks | |
| 7,547,980 B2 | 6/2009 | Harrison | |
| 7,753,010 B2 | 7/2010 | Rutledge | |
| 7,913,783 B2 | 3/2011 | Elmaleh | |
| 8,063,609 B2 | 11/2011 | Salasoo et al. | |
| 8,206,263 B2 | 6/2012 | Tsuchikawa | |
| 8,347,999 B2 | 1/2013 | Koelsch et al. | |
| 8,573,346 B2 | 11/2013 | Duignan | |
| 8,643,201 B2 * | 2/2014 | Scott | H02K 7/1846 |
| | | | 290/1 R |
| 8,712,620 B2 | 4/2014 | Jackson | |
| 8,723,344 B1 | 5/2014 | Dierickx | |
| 8,872,368 B1 | 10/2014 | Kim et al. | |
| 8,907,631 B1 | 12/2014 | Gurries | |
| 9,236,761 B2 | 1/2016 | Strothmann | |
| 9,242,698 B2 | 1/2016 | Frieden | |
| 9,321,357 B2 | 4/2016 | Caldeira et al. | |
| 9,376,971 B2 | 6/2016 | Luther et al. | |
| 9,415,660 B2 | 8/2016 | Koelsch | |
| 9,457,666 B2 | 10/2016 | Caldeira et al. | |
| 9,981,553 B2 | 5/2018 | Schafer et al. | |
| 10,077,056 B1 | 9/2018 | Fields et al. | |
| 10,293,702 B2 | 5/2019 | Tu et al. | |
| 10,513,180 B2 | 12/2019 | Quill | |
| 10,787,089 B1 | 9/2020 | Macaluso | |
| 10,797,564 B1 * | 10/2020 | Griggs | H02K 7/116 |
| 10,889,186 B2 | 1/2021 | Schutt | |
| 10,903,679 B2 * | 1/2021 | Schmalzrieth | H02J 7/32 |
| 11,007,878 B2 | 5/2021 | Kamino et al. | |
| 11,072,254 B1 | 7/2021 | Macaluso | |
| 11,117,481 B2 | 9/2021 | Macaluso | |
| 11,130,415 B2 | 9/2021 | Macaluso | |
| 11,133,729 B2 | 9/2021 | Macaluso | |
| 11,222,750 B1 | 1/2022 | Macaluso | |
| 11,289,974 B2 | 3/2022 | Macaluso | |
| 11,299,054 B2 | 4/2022 | Macaluso | |
| 11,318,856 B2 | 5/2022 | Macaluso | |
| 11,322,311 B2 | 5/2022 | Macaluso | |
| 11,472,306 B1 | 10/2022 | Macaluso | |
| 11,548,399 B1 | 1/2023 | Macaluso | |
| 11,577,606 B1 | 2/2023 | Macaluso | |
| 2003/0071464 A1 | 4/2003 | Chiu | |
| 2003/0139859 A1 | 7/2003 | Hanada | |
| 2003/0184258 A1 | 10/2003 | VonderHaar | |
| 2004/0012205 A1 | 1/2004 | Sua-An | |
| 2005/0224263 A1 | 10/2005 | Vasilantone | |
| 2006/0238258 A1 | 10/2006 | D'Amore | |
| 2007/0075677 A1 | 4/2007 | Alvarez-Troncoso | |
| 2007/0090702 A1 | 4/2007 | Schiller | |
| 2007/0187957 A1 | 8/2007 | Harrison | |
| 2008/0066979 A1 | 3/2008 | Carter | |
| 2008/0223637 A1 | 9/2008 | Bartilson | |
| 2008/0289890 A1 | 11/2008 | Stoltzfus | |
| 2008/0297109 A1 | 12/2008 | Sandberg et al. | |
| 2009/0033254 A1 | 2/2009 | Nagashima et al. | |
| 2009/0079417 A1 | 3/2009 | Mort et al. | |
| 2009/0145674 A1 | 6/2009 | Lee | |
| 2009/0194998 A1 | 8/2009 | Lin | |
| 2009/0230766 A1 | 9/2009 | Miyama | |
| 2010/0019718 A1 | 1/2010 | Salasoo et al. | |
| 2010/0117600 A1 | 5/2010 | Fazakas | |
| 2010/0327600 A1 | 12/2010 | Koelsch | |
| 2011/0106329 A1 | 5/2011 | Donnelly et al. | |
| 2011/0163717 A1 | 7/2011 | Gale | |
| 2011/0189507 A1 | 8/2011 | Reis | |
| 2011/0200193 A1 | 8/2011 | Blitz et al. | |
| 2011/0320074 A1 | 12/2011 | Erlston et al. | |
| 2012/0012406 A1 | 1/2012 | Stoicoviciu | |
| 2012/0237799 A1 | 9/2012 | Jiang | |
| 2012/0309455 A1 | 12/2012 | Klose et al. | |
| 2013/0081886 A1 | 4/2013 | Jaberian | |
| 2013/0096759 A1 | 4/2013 | Breton et al. | |
| 2013/0119665 A1 | 5/2013 | Berbari | |
| 2013/0257145 A1 | 10/2013 | Caldeira et al. | |
| 2013/0266826 A1 | 10/2013 | Cowperthwaite | |
| 2013/0332014 A1 | 12/2013 | Jackson | |
| 2014/0091573 A1 | 4/2014 | Berbari | |
| 2014/0132155 A1 | 5/2014 | Strothmann | |
| 2014/0197780 A1 | 7/2014 | Imamura | |
| 2014/0210398 A1 | 7/2014 | Powell | |
| 2014/0244082 A1 | 8/2014 | Caron | |
| 2014/0266004 A1 | 9/2014 | Andrews, Jr. | |
| 2014/0266070 A1 | 9/2014 | Kurtzman | |
| 2014/0285209 A1 | 9/2014 | Stichowski et al. | |
| 2014/0368041 A1 | 12/2014 | Tu et al. | |
| 2015/0008867 A1 | 1/2015 | Smychkovich | |
| 2015/0089981 A1 | 4/2015 | Renfro | |
| 2015/0197780 A1 | 6/2015 | Xu | |
| 2015/0249362 A1 | 9/2015 | Bridgelall et al. | |
| 2015/0260835 A1 | 9/2015 | Widmer et al. | |
| 2015/0262154 A1 | 9/2015 | Wolfson | |
| 2015/0343909 A1 | 12/2015 | Hikiri | |
| 2016/0034952 A1 | 2/2016 | Parkin et al. | |
| 2016/0089981 A1 | 3/2016 | Kodawara | |
| 2016/0111907 A1 | 4/2016 | Lynds | |
| 2016/0164373 A1 | 6/2016 | Liao et al. | |
| 2016/0236578 A1 | 8/2016 | Liao | |
| 2016/0243960 A1 | 8/2016 | Wood | |
| 2016/0348788 A1 | 12/2016 | Lemmers | |
| 2017/0063124 A1 | 3/2017 | Yu et al. | |
| 2017/0117720 A1 | 4/2017 | Yung | |
| 2017/0131999 A1 | 5/2017 | Dolby et al. | |
| 2017/0176540 A1 | 6/2017 | Omi | |
| 2017/0191459 A1 | 7/2017 | Zhang | |

(56) References Cited

U.S. PATENT DOCUMENTS

| | | |
|---|---|---|
| 2017/0366017 A1 | 12/2017 | Clay et al. |
| 2018/0009329 A1 | 1/2018 | Tellez |
| 2018/0083469 A1 | 3/2018 | Bauer et al. |
| 2018/0154779 A1 | 6/2018 | Choi |
| 2018/0156144 A1 | 6/2018 | Inoue |
| 2018/0166750 A1 | 6/2018 | Chang |
| 2018/0215272 A1 | 8/2018 | Vitullo et al. |
| 2018/0254732 A1 | 9/2018 | Smolenaers |
| 2018/0312159 A1 | 11/2018 | Jent, II |
| 2019/0001804 A1 | 1/2019 | Wilhide |
| 2019/0004580 A1 | 1/2019 | Wilhide |
| 2019/0077254 A1 | 3/2019 | Stanley |
| 2019/0140245 A1 | 5/2019 | Mensch |
| 2019/0184843 A1 | 6/2019 | Jung et al. |
| 2019/0245375 A1 | 8/2019 | Schmalzrieth et al. |
| 2019/0329650 A1 | 10/2019 | Quill |
| 2019/0351895 A1 | 11/2019 | Ben-Ari |
| 2019/0351899 A1 | 11/2019 | Adam |
| 2019/0351948 A1 | 11/2019 | Derissaint |
| 2019/0359080 A1 | 11/2019 | Hellgren |
| 2020/0039379 A1 | 2/2020 | Schlosser |
| 2020/0094695 A1 | 3/2020 | Bowman |
| 2020/0207209 A1 | 7/2020 | Engel |
| 2020/0381784 A1 | 12/2020 | Yamamoto |
| 2020/0384873 A1 | 12/2020 | Macaluso |
| 2021/0001737 A1 | 1/2021 | Hoess et al. |
| 2021/0046833 A1 | 2/2021 | Macaluso |
| 2021/0197687 A1 | 7/2021 | Searcy |
| 2021/0313121 A1 | 10/2021 | Macaluso |
| 2021/0334913 A1 | 10/2021 | Klein |
| 2022/0016941 A1 | 1/2022 | Sams |
| 2022/0028625 A1 | 1/2022 | Macaluso |
| 2022/0028627 A1 | 1/2022 | Macaluso |
| 2022/0052582 A1 | 2/2022 | Giannotta |
| 2022/0068570 A1 | 3/2022 | Macaluso |
| 2022/0167134 A1 | 5/2022 | Macaluso |
| 2022/0209624 A1 | 6/2022 | Macaluso |
| 2022/0234458 A1 | 7/2022 | Macaluso |
| 2022/0301775 A1 | 9/2022 | Macaluso |
| 2022/0360141 A1 | 11/2022 | Macaluso |
| 2023/0026897 A1 | 1/2023 | Macaluso |

FOREIGN PATENT DOCUMENTS

| | | |
|---|---|---|
| EP | 1 253 698 | 10/2002 |
| WO | WO 09/149769 | 12/2009 |
| WO | WO 10/133863 | 11/2010 |
| WO | WO 17/213079 | 12/2017 |
| WO | WO 19/219997 | 11/2019 |
| WO | WO 20/191367 | 9/2020 |
| WO | WO 22/219510 | 10/2022 |

* cited by examiner

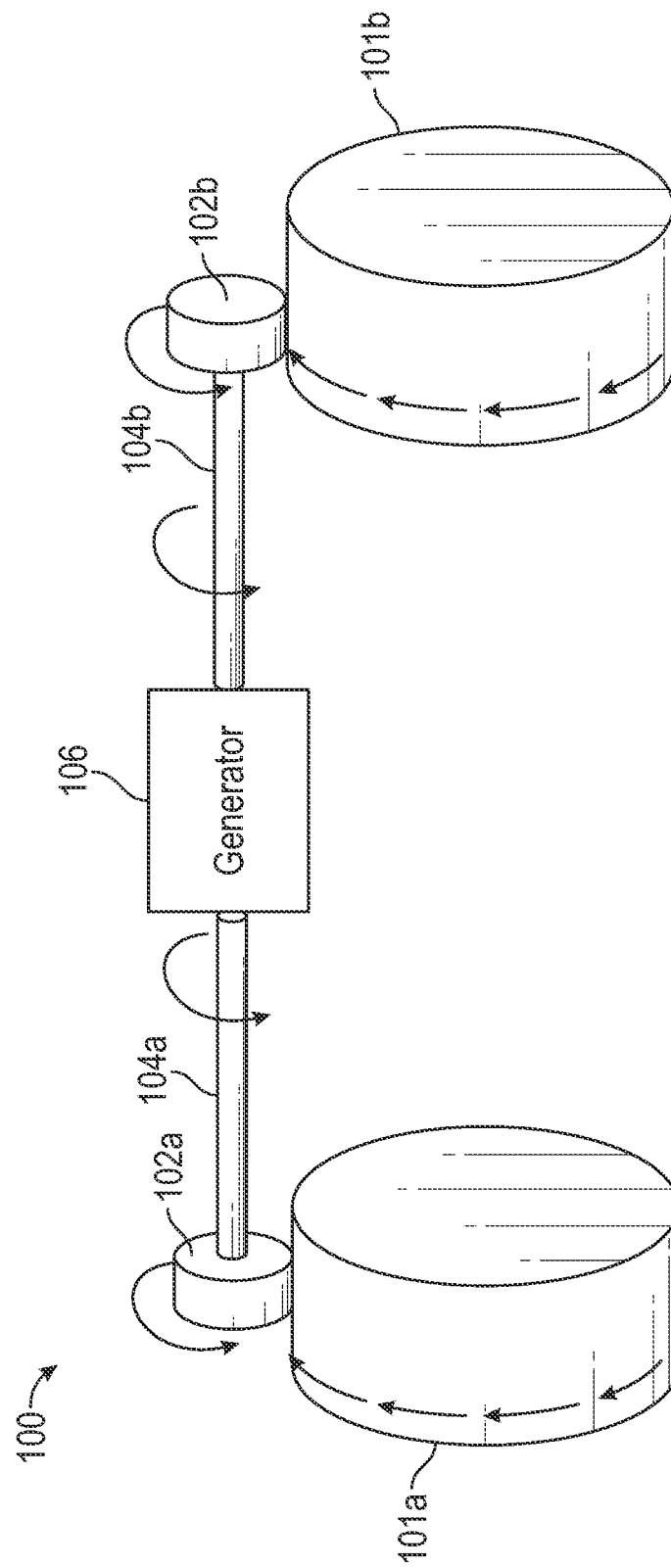

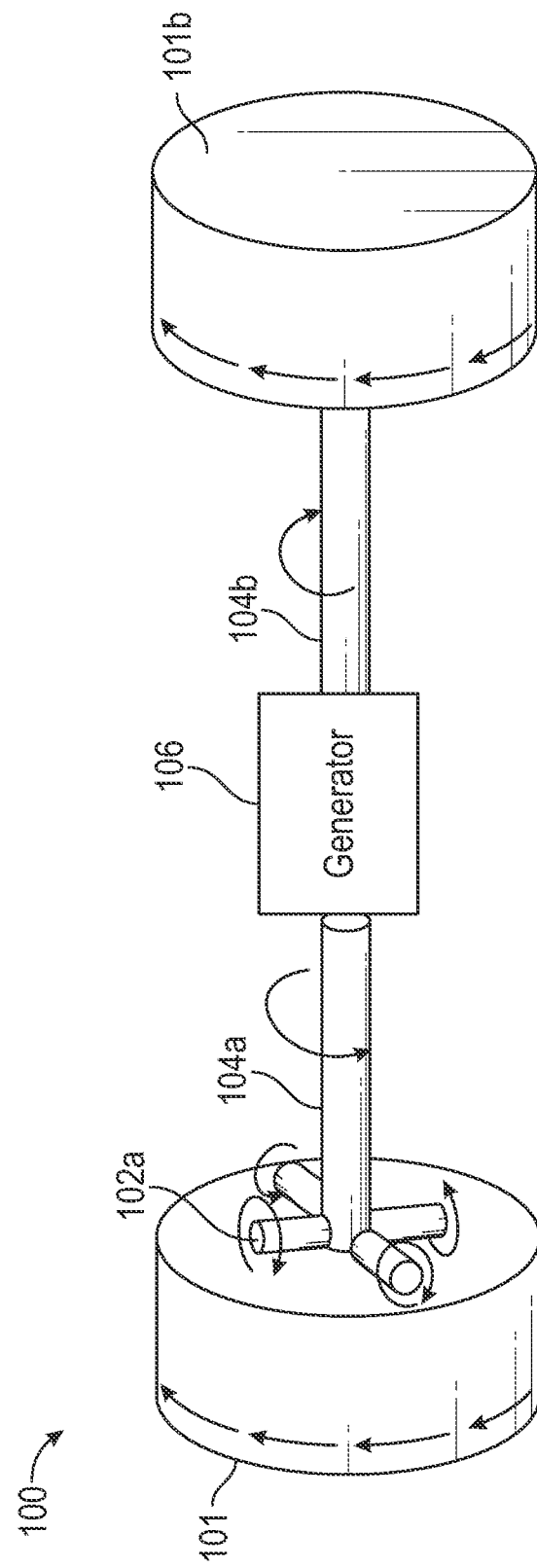

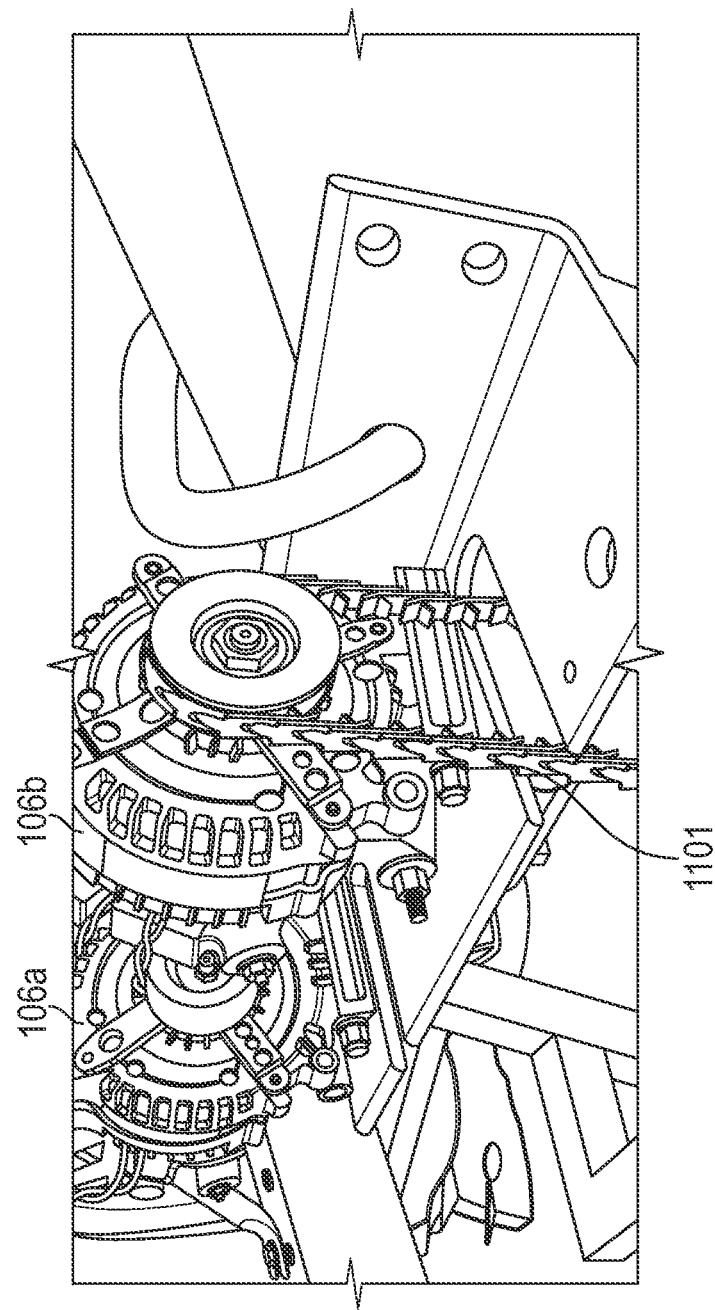

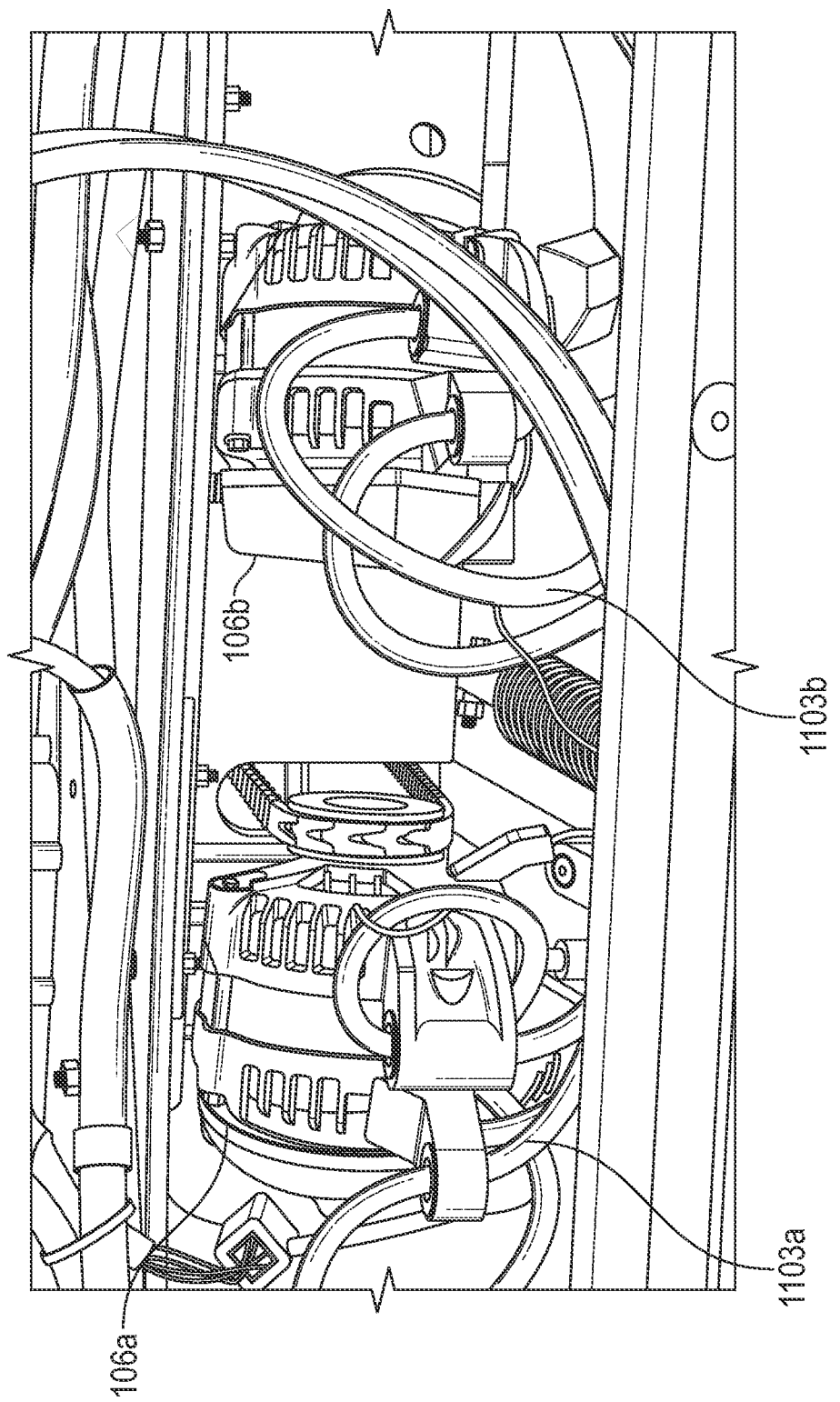

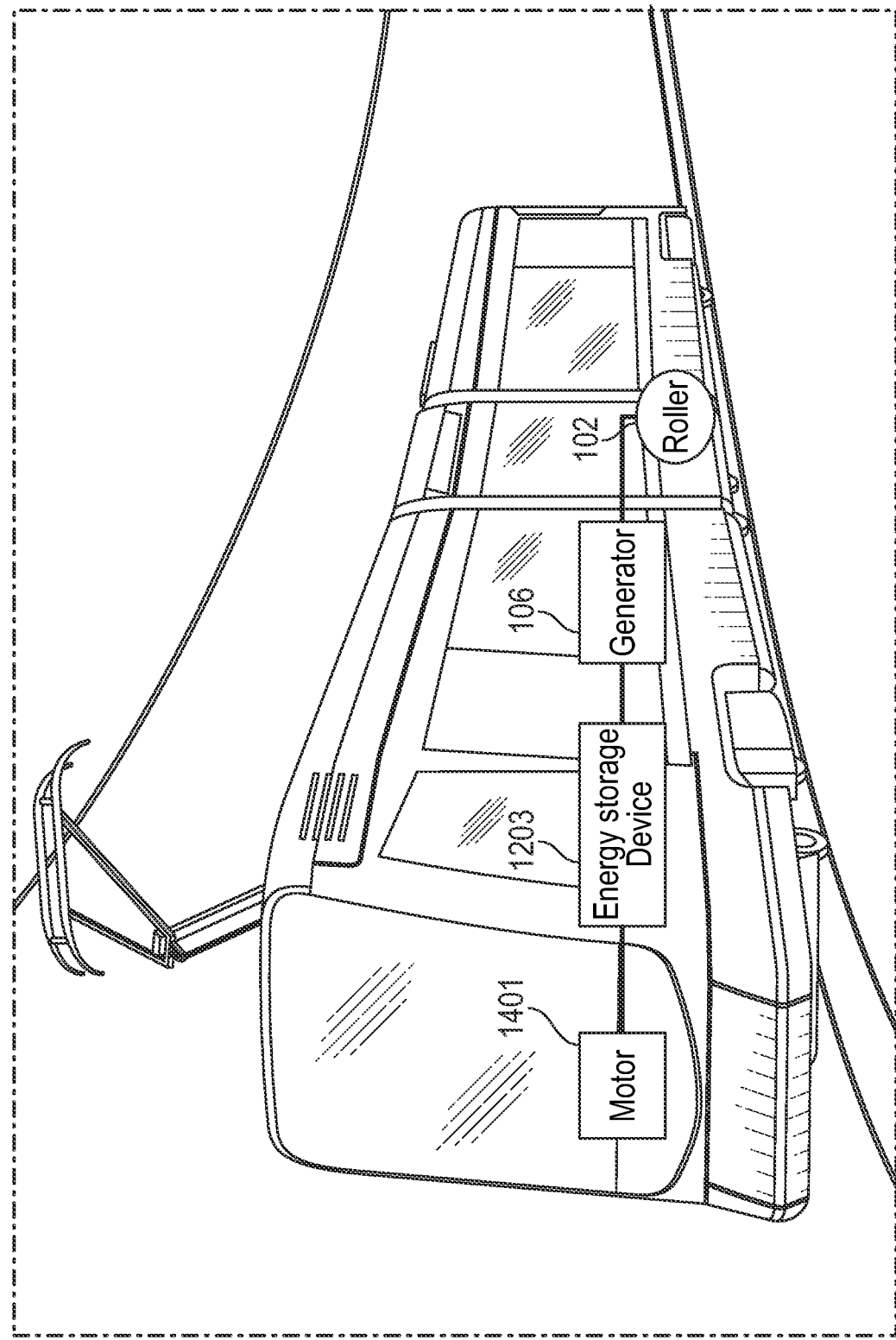

POWER GENERATION FROM VEHICLE WHEEL ROTATION

CROSS REFERENCE TO RELATED APPLICATIONS

This application is a continuation of U.S. patent application Ser. No. 17/699,694, filed Mar. 21, 2022, and issued as U.S. Pat. No. 11,431,225 on Aug. 30, 2022, which is a continuation of U.S. patent application Ser. No. 17/410,272, filed Aug. 24, 2021, and issued as U.S. Pat. No. 11,289,974 on Mar. 29, 2022, which claims benefit of priority and is related to U.S. Provisional Patent Application No. 63/140,805, filed Jan. 23, 2021, and which is a continuation-in-part of U.S. patent application Ser. No. 17/332,824, filed May 27, 2021, which claims benefit of priority to U.S. Provisional Patent Application No. 63/164,474, filed Mar. 22, 2021, and which claims benefit of priority to U.S. Provisional Patent Application No. 63/140,805, filed Jan. 23, 2021, and which is a continuation-in-part of U.S. patent application Ser. No. 17/141,518, filed Jan. 5, 2021, and issued as U.S. Pat. No. 11,133,729 on Sep. 28, 2021, which is a continuation-in-part of U.S. patent application Ser. No. 16/847,538, filed Apr. 13, 2020, which claims benefit of priority and is related to U.S. Provisional Patent Application No. 62/858,902, filed Jun. 7, 2019, U.S. Provisional Patent Application No. 62/883,523, filed Aug. 6, 2019, and U.S. Provisional Patent Application No. 62/967,406, filed Jan. 29, 2020. The disclosure of each of the aforementioned applications is incorporated herein in its entirety for all purposes.

FIELD OF THE DISCLOSURE

The present disclosure relates generally to generating and providing energy for a vehicle powered, at least in part, by electricity, and more specifically, to generating and conveying the energy to the vehicle while the vehicle is mobile.

BACKGROUND

Electric vehicles derive locomotion power from electricity often received from an energy storage device within the electric vehicle. Battery electric vehicles (BEVs) are often proposed to have an energy storage/containment device, such as a battery, that is charged through some type of wired or wireless connection at one or more stationary locations, for example household or commercial supply sources. The wired charging connections require cables or other similar connectors physically connected to a stationary power supply. The wireless charging connections require antenna(s) or other similar structures wirelessly connected to a power supply that generates a wireless field via its own antenna(s). However, such wired and wireless stationary charging systems may be inconvenient or cumbersome and have other drawbacks, such as degradation during energy transference, inefficiencies or losses, requiring a specific location for charging, and so forth. As such, alternatives for stationary wired or wireless charging systems and methods that efficiently and safely transfer energy for charging electric vehicles are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides an apparatus for generating energy in response to a vehicle wheel rotation. The apparatus may comprise: a first roller which may comprise a curved roller surface configured to be positioned in substantial physical contact with a curved wheel surface of a first wheel of the vehicle, and wherein the first roller may be configured to rotate in response to a rotation of the first wheel; a first shaft coupled to the first roller such that rotation of the first roller can cause the first shaft to rotate; and a first generator operably coupled to the first shaft and which may be configured to: generate an electrical output based on the rotation of the first shaft; and convey the electrical output to an energy storage device or to a motor of the vehicle that can convert electrical energy to mechanical energy to rotate one or more wheels of the vehicle.

In some implementations, the apparatus can comprise a second roller which can comprise a curved roller surface which can be configured to be positioned in substantial physical contact with the curved wheel surface of the first wheel. The second roller can be configured to rotate in response to a rotation of the first wheel. The apparatus can comprise a second shaft coupled to the second roller such that rotation of the second roller can cause the second shaft to rotate. The first generator can be operably coupled to the second shaft and can be configured to generate an electrical output based on the rotation of the second shaft.

In some implementations, the apparatus can comprise a second roller that can comprise a curved roller surface configured to make substantial physical contact with the curved wheel surface of the first wheel of the vehicle. The second roller can be configured to rotate in response to a rotation of the first wheel. The apparatus can comprise: a second shaft coupled to the second roller such that rotation of the second roller can cause the second shaft to rotate; and a second generator operably coupled to the second shaft and that can be configured to: generate an electrical output based on the rotation of the second shaft; and convey the electrical output to an energy storage device or to a motor of the vehicle that can convert electrical energy to mechanical energy to rotate one or more wheels of the vehicle.

In some implementations, the apparatus can comprise a second roller that can comprise: a curved roller surface configured to be positioned in substantial physical contact with a curved wheel surface of a second wheel of the vehicle and wherein the second roller can be configured to rotate in response to a rotation of the second wheel; and a second shaft that can be coupled to the second roller such that rotation of the second roller can cause the second shaft to rotate. The first generator can be operably coupled to the second shaft and can be configured to generate an electrical output based on the rotation of the second shaft.

In some implementations, the apparatus can comprise: a second roller that can comprise a curved roller surface that can be configured to be positioned in substantial physical contact with a curved wheel surface of a second wheel of the vehicle. The second roller can be configured to rotate in response to a rotation of the second wheel. The apparatus can comprise: a second shaft that can be coupled to the second roller such that rotation of the second roller can cause the second shaft to rotate; and a second generator that can be operably coupled to the second shaft and that can be configured to: generate an electrical output based on the rotation of the second shaft; and convey the electrical output to an energy storage device or to a motor of the vehicle that can convert electrical energy to mechanical energy to rotate one or more wheels of the vehicle.

In some implementations, the first roller can be configured to change diameter such that the first roller can be configured to rotate at one or more rotational velocities in response to a rotational velocity of the first wheel.

In some implementations, the first roller can be configured to change a rotational inertia.

In some implementations, the apparatus can exist in one of (1) an engaged state in which the rotation of the first wheel can cause the first shaft to rotate to cause the generator to generate an electrical output and (2) a disengaged state in which the rotation of the first wheel may not cause the first shaft to rotate.

In some implementations, the apparatus can be configured to transition between the engaged state and the disengaged state automatically based, at least in part, in response to an energy demand of the motor of the vehicle or a rotational velocity of the first wheel.

The present disclosure provides an apparatus for generating energy in response to a vehicle wheel rotation. The apparatus can comprise: a first roller that can comprise a curved roller surface and that can be configured to be positioned in substantial physical contact with a sidewall surface of a first wheel of the vehicle. The first roller can be configured to rotate in response to a rotation of the first wheel. The apparatus can comprise: a first shaft that can be coupled to the first roller such that rotation of the first roller can cause the first shaft to rotate; and a first generator that can be operably coupled to the first shaft and that can be configured to: generate an electrical output based on the rotation of the first shaft; and convey the electrical output to an energy storage device or to a motor of the vehicle that can convert electrical energy to mechanical energy to rotate one or more wheels of the vehicle.

In some implementations, the apparatus can comprise: a second roller that can comprise a curved roller surface that can be configured to be positioned in substantial physical contact with the sidewall surface of the first wheel. The second roller can be configured to rotate in response to a rotation of the first wheel. The first shaft can be coupled to the second roller such that rotation of the second roller can cause the first shaft to rotate. The first and second rollers can rotate about an axis that is substantially orthogonal to an axis about which the first shaft rotates.

In some implementations, the first roller can comprise a first end and a second end. The first end can be in closer physical proximity to an axis of rotation of the first wheel than the second end. The first shaft can be coupled to the first end of the first roller.

In some implementations, the first roller can comprise: a first end having a first diameter size; and a second end having a second diameter size. The second diameter size can be greater than the first diameter size. The first end can be in closer physical proximity to an axis of rotation of the first wheel than the second end.

In some implementations, the first shaft can be configured to rotate in response to a rotational inertia of the first shaft when the first roller is not rotating.

In some implementations, the apparatus can exist in one of (1) an engaged state in which the rotation of the first wheel can cause the first shaft to rotate to cause the generator to generate an electrical output and (2) a disengaged state in which the rotation of the first wheel may not cause the first shaft to rotate.

In some implementations, the apparatus can be configured to transition between the engaged state and the disengaged state automatically based, at least in part, in response to an energy demand of the motor of the vehicle or a rotational velocity of the first wheel.

The present disclosure provides a method for generating energy in response to a vehicle wheel rotation. The method can comprise, for example, rotating a first roller in response to a rotation of a first wheel of a vehicle. The first roller can comprise a curved roller surface in substantial physical contact with a sidewall surface of the first wheel. The method can comprise, for example, rotating a first shaft in response to a rotation of the first roller. The first shaft can be coupled to the first roller such that rotation of the first roller can cause the first shaft to rotate. The method can comprise, for example, generating, via a generator, an electrical output based on the rotation of the first shaft. The generator can be operably coupled to the first shaft. The method can comprise, for example, conveying the electrical output to an energy storage device or to a motor of the vehicle that can convert electrical energy to mechanical energy to rotate one or more wheels of the vehicle.

In some implementations, the method can comprise, for example, rotating a second roller in response to a rotation of the first wheel. The second roller can comprise a curved roller surface in substantial physical contact with a sidewall surface of the first wheel. The method can comprise, for example, rotating the first shaft in response to a rotation of the second roller. The first shaft can be coupled to the second roller such that rotation of the second roller can cause the first shaft to rotate. The first and second rollers can rotate about an axis that is substantially orthogonal to an axis about which the first shaft rotates.

In some implementations, the first roller can comprise: a first end having a first diameter size; and a second end having a second diameter size. The second diameter size can be greater than the first diameter size and the first end can be in closer physical proximity to an axis of rotation of the first wheel than the second end, and the first shaft can be coupled to the first end of the first roller.

In some implementations, the apparatus can exist in one of (1) an engaged state in which the rotation of the first wheel can cause the first shaft to rotate to cause the generator to generate an electrical output and (2) a disengaged state in which the rotation of the first wheel may not cause the first shaft to rotate. The method can further comprise automatically transitioning between the engaged state and the disengaged state based, at least in part, in response to an energy demand of the motor of the vehicle or a rotational velocity of the first wheel.

BRIEF DESCRIPTION OF THE DRAWINGS

FIGS. 4A-4B are schematic diagrams illustrating example embodiments of the apparatus implemented on multiple wheels of a vehicle.

FIGS. 8A-8B are schematic diagrams illustrating example embodiments of the apparatus implemented on sidewalls of multiple wheels of a vehicle.

FIGS. 11A-11B is a diagram illustrating examples embodiments of generators coupled to roller(s) of the apparatus.

DETAILED DESCRIPTION

Overview

Example embodiments and implementations of an apparatus for generating energy (e.g., in response to the rotation of a wheel of a vehicle) are described herein. The apparatus can be implemented in conjunction with a vehicle, such as an electric vehicle. The vehicle can include a car, a truck, a semi-truck, a tractor-trailer, a tractor, farm equipment, construction equipment, carts, scooters, motorcycles, bicycles, trains, trams, and the like, for example. The apparatus can comprise one or more rollers configured to be rotatably couplable (e.g., removably coupled either through direct physical contact or through indirect operable coupling) to one or more wheels of a vehicle such that rotation of a wheel of the vehicle causes rotation of the one or more rollers. The one or more rollers can be rotatably coupled (either through direct physical contact or through indirect operable coupling) to one or more generators. The generators can be configured to generate energy (e.g., an electrical output), in response to rotation of the one or more rollers. In some embodiments, the one or more rollers can be rotatably coupled to the one or more generators via one or more shafts configured to rotate in response to a rotation of the one or more rollers. In some embodiments, the one or more rollers can be rotatably coupled to the one or more generators via one or more other mechanical coupling devices such as a chain, belt, gearing, pulley, sprocket and the like. In some embodiments, the one or more generators can provide generated energy (e.g., electrical output) to the vehicle. The electrical output that is provided to the vehicle from the generator may be used to power the vehicle. For example, the electrical output may be conveyed to a motor of the vehicle and/or to an energy storage device of the vehicle for later use and/or consumption by the vehicle.

Example Apparatus Embodiments and Implementations

Various example embodiments of an apparatus for generating energy are described herein, for example, with reference to the figures. The various embodiments and their implementations are given as examples and are not meant to be limiting of the present disclosure.

Furthermore, the structural and/or operational features described with reference to any of the example embodiments and/or figures are not meant to be limited to that embodiment and/or figure. Rather the structural and/or operation features of the various embodiments and figures may be implemented or otherwise combined in each of the various other embodiments.

Figure 1A:
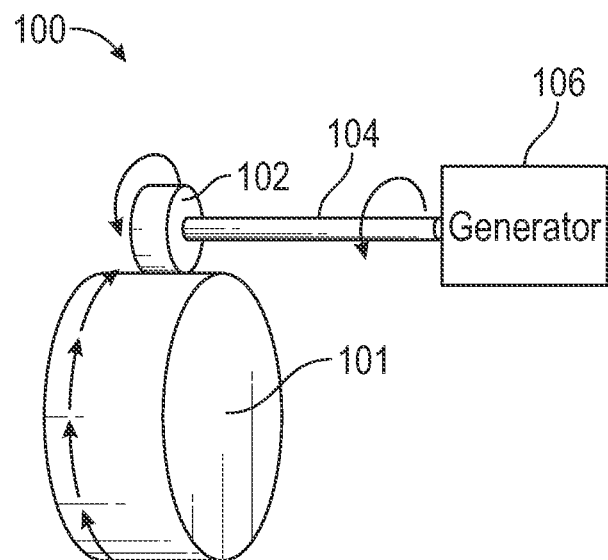
FIG. 1A is a schematic diagram illustrating an example embodiment of an apparatus for generating energy in response to rotation of a wheel of vehicle.

FIG. 1A is a diagram illustrating an example embodiment of an apparatus 100 comprising a roller rotatably couplable to a wheel of a vehicle. As shown in FIG. 1A, the apparatus 100 may comprise a roller 102, a shaft 104 and a generator 106. The roller 102 may comprise a substantially cylindrical shape comprising a length, a diameter, a curved surface and a center axis as described in greater detail with reference to FIG. 2. A curved surface of the roller 102 may be in substantial physical contact with a curved surface of the wheel 101. The center axis of the roller 102 may be substantially parallel to a center axis of the wheel 101. The roller 102 may be configured to rotate about its center axis. The roller 102 may be rotatably couplable to a wheel 101 of the vehicle such that rotation of the wheel 101 causes rotation of the roller 102. The roller 102 may rotate in an opposite direction than the wheel 101, for example as shown in FIG. 1A. The roller 102 may rotate at a greater rotational velocity than the wheel 101.

With continued reference to FIG. 1A, the roller 102 may be rotatably coupled to a shaft 104 such that rotation of the roller 102 can cause rotation of the shaft 104. The shaft 104 may rotate about an axis that is substantially parallel to the axis of the roller 102 and may rotate in a same direction as the roller 102, for example as shown in FIG. 1A. In some embodiments, the shaft 104 may be fixedly rotatably coupled to the roller 102 such that the shaft 104 can only rotate when the roller 102 rotates. In some embodiments, the shaft 104 may be configured to rotate when the roller 102 is not rotating. For example, after a roller 102 discontinues rotating, the shaft 104 may continue to rotate, for example due to rotational inertia. For example, the roller 102 and/or shaft 104 may comprise a one-way ratchet device that causes the shaft 104 to rotate when the roller 102 rotates and allows the shaft 104 to continue to rotate for a period of time even after the roller 102 stops rotating. In some embodiments, the shaft 104 may be configured to not rotate when the roller 102 is rotating. For example, in a disengaged state, as discussed in greater detail herein, the roller 102 may rotate in response to rotation of a vehicle wheel but may not cause rotation of the shaft 104 to generate energy at the generator 106.

The shaft 104 may be operably coupled to a generator 106. The generator 106 may be configured to generate energy (e.g., an electrical output) in response to mechanical movement such as the rotation of the shaft 104. The generator 106 may be electrically coupled to the vehicle and may provide generated energy to the vehicle, for example to a motor of the vehicle and/or to an energy storage device of the vehicle that includes one or more batteries and/or capacitors (e.g., ultracapacitors) or one or more hypercapacitors.

Figure 1B:
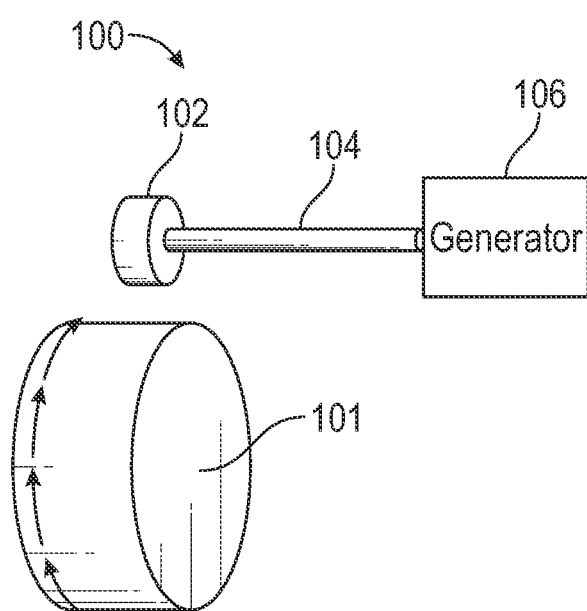
FIG. 1B is a schematic diagram illustrating an example embodiment of the apparatus of FIG. 1A in a disengaged state.

FIG. 1B is a diagram illustrating an example embodiment of the apparatus 100 comprising a roller that is removably coupled to a wheel of a vehicle. The apparatus 100 may exist in one of (1) an engaged state or (2) a disengaged state. In the engaged state, the roller 102 may be in physical contact with the wheel 101 (e.g., rotatably coupled to the wheel 101) in which the rotation of the wheel 101 causes the roller 102 to rotate. In some embodiments, in the disengaged state, the roller 102 may not be in physical contact with the wheel 101 such that rotation of the wheel 101 does not cause the roller 102 to rotate. In some embodiments, in the disengaged state, the roller 102 may be in physical contact with the wheel 101 such that rotation of the wheel 101 causes the roller 102 to rotate but the roller 102 may not be rotatably coupled to the shaft 104 such that rotation of the roller 102 does not cause the shaft 104 (or other similar component) to rotate to cause generation of energy at the generator 106.

FIG. 1B shows a roller 102 in an example disengaged state such that the roller 102 is not in physical contact with the wheel 101 and will not rotate in response to a rotation of the wheel 101. The roller 102 may transition between the engaged and the disengaged states. In some embodiments, the roller 102 may transition between the engaged and the disengaged states automatically, for example, based at least in part on an energy demand of the vehicle (e.g., an energy demand of a motor of the vehicle) and/or a rotational velocity of the wheel 101. In some embodiments, the roller 102 may transition between the engaged and the disengaged states in response to a user input, such as a driver of the vehicle activating a user input device, such as a button, lever, or switch.

Figure 2:
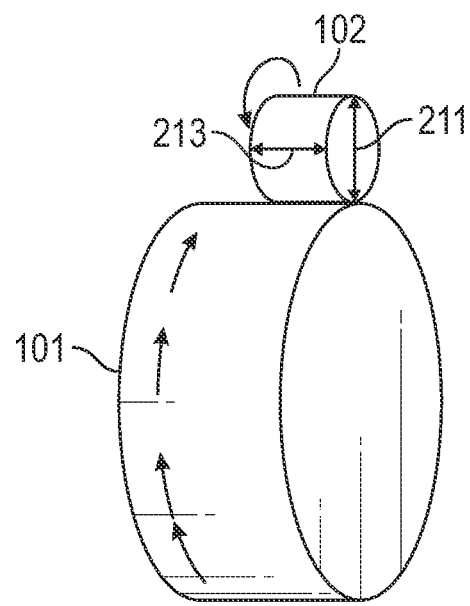
FIG. 2 is a schematic diagram illustrating that a roller of the apparatus can have various dimensions.

FIG. 2 is a diagram illustrating an example embodiment of a roller 102. As shown in FIG. 2, the roller 102 may comprise a length 213 and a diameter 211. The roller 102 may have any length 213 such as is required or desired. The roller 102 may have any diameter 211 such as is required or desired. The diameter 211 of the roller 102 may be less than the diameter of the wheel 101 such that the roller 102 rotates at a greater rotational velocity than the wheel 101 in response to a rotation of the wheel 101. In some embodiments comprising multiple rollers, one, some or each of the multiple rollers may have a length and/or diameter that is different than the length and/or diameters of the other rollers.

In some embodiments, the roller 102 may be configured to change a size of diameter 211. In response to changing size of diameter 211, the roller 102 may rotate at various rotational velocities in response to rotation of the wheel 101 at a single rotational velocity. In some embodiments, the roller 102 may be configured to change size of diameter 211 automatically, for example, based at least in part on an energy demand of the vehicle (e.g., an energy demand of a motor of the vehicle) and/or a rotational velocity of the wheel 101.

Figure 3A:
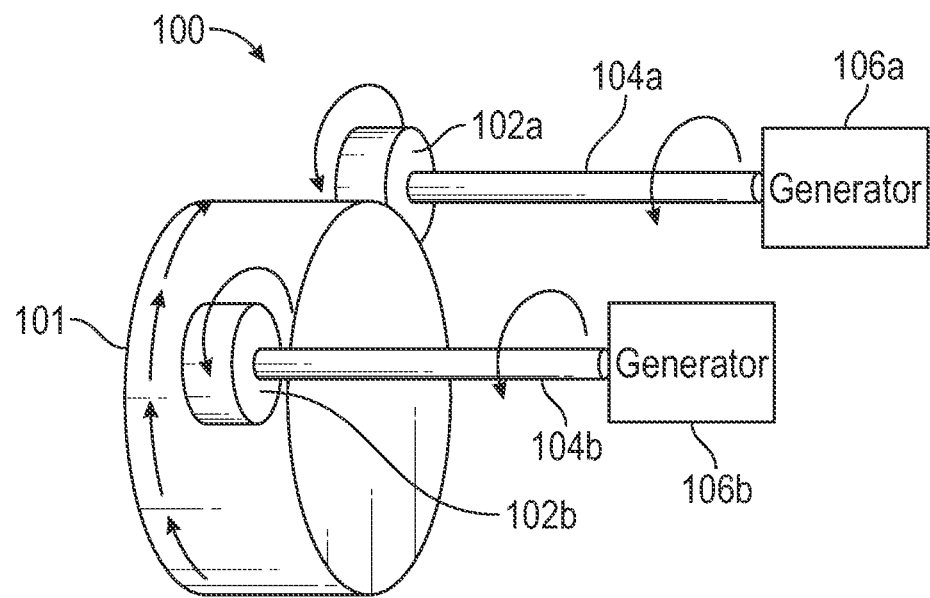
FIGS. 3A-3B are schematic diagrams illustrating example embodiments of the apparatus comprising multiple rollers.

FIG. 3A is a diagram illustrating an example embodiment of the apparatus 100 comprising two rollers and two generators. As shown in FIG. 3A, the apparatus 100 may comprise a first roller 102a, a first shaft 104a, a first generator 106a, a second roller 102b, a second shaft 104b and a second generator 106b. The components of the example embodiment shown in FIG. 3A may comprise similar structural and/or operational features as described with reference to other embodiments described herein, for example, the example embodiment of FIG. 1A. For example, the rotation of the wheel 101 may cause the rollers 102a/102b to rotate thereby causing shafts 104a/104b to rotate thereby causing the generators 106a/106b to generator energy. FIG. 3A is not meant to be limiting of the present disclosure. The apparatus 100 may comprise any number of rollers, shafts and/or generators as required and/or desired.

Figure 3B:
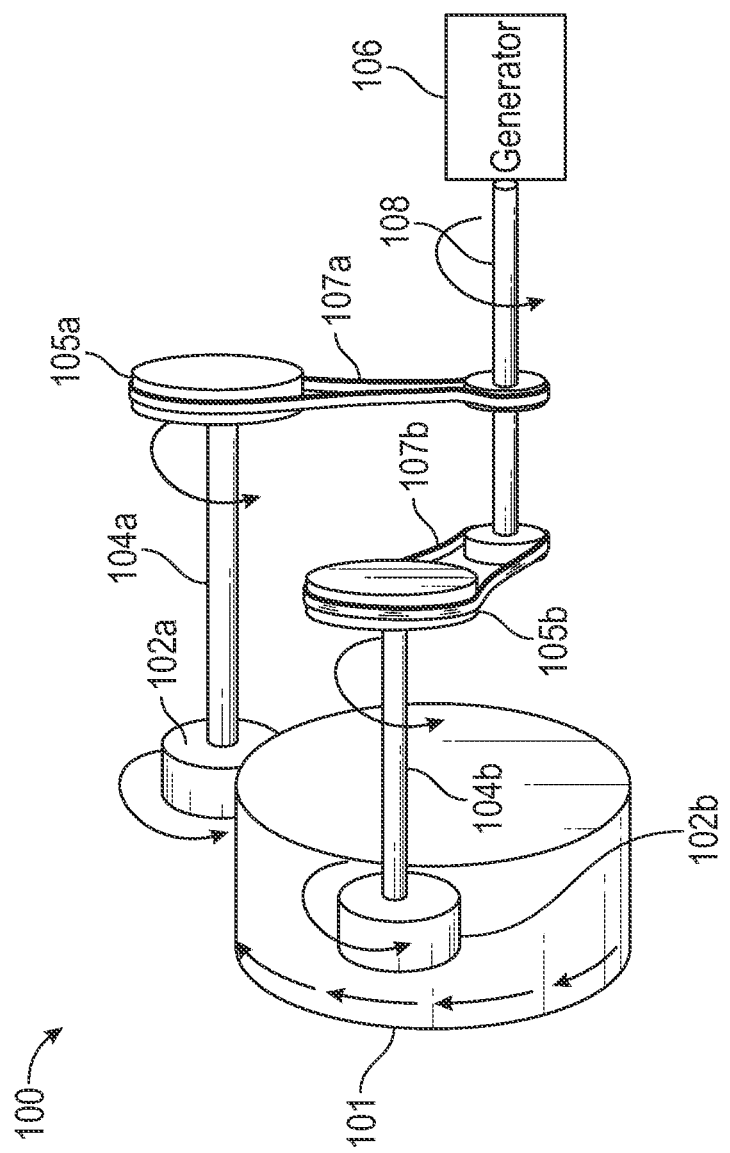

FIG. 3B is a diagram illustrating an example embodiment of the apparatus 100 comprising two rollers and a generator. As shown in FIG. 3B, the apparatus 100 may comprise a first roller 102a, a first shaft 104a, a first sprocket 105a, a first coupling device 107a, a second roller 102b, a second shaft 104b, a second sprocket 105b, a second coupling device 107b, a third shaft 108 and generator 106. The components of the example embodiment shown in FIG. 3B may comprise similar structural and/or operational features as described with reference to other embodiments described herein, for example FIG. 1A. The sprockets 105a/105b may be rotatably coupled to the shafts 104a/104b and may rotate in response to rotation of the shafts 104a/104b. The sprockets 105a/105b may be rotatably coupled to a third shaft 108, for example via coupling devices 107a/107b as shown in FIG. 3B. The coupling devices 107a/107b may comprise one or more of a chain, belt, gearing, pulley or the like. The third shaft 108 may be operably coupled to the generator 106 such that rotation of the third shaft 108 causes the generator to generate energy. Thus, the generator 106 may generate energy in response to a rotation of the first and/or second rollers 102a/102b.

In some embodiments, the third shaft 108 may rotate in response to simultaneous rotations of the first and second rollers 102a/102b. In some embodiments, the third shaft 108 may rotate in response to rotation of either the first or second rollers 102a/102b.

In some embodiments, the shafts 104a/104b may be fixedly rotatably coupled to the sprockets 105a/105b such that the sprockets 105a/105b can only rotate when the shafts 104a/104b rotate. In some embodiments, the sprockets 105a/105b may be configured to rotate when the shafts 104a/104b are not rotating, for example, after the shafts 104a/104b discontinue rotating, the sprockets 105a/105b may continue to rotate, for example due to rotational inertia. For example, the shafts 104a/104b and/or sprockets 105a/105b may comprise a one-way ratchet device that causes the sprockets 105a/105b to rotate when the shafts 104a/104b rotate and allows the sprockets 105a/105b to continue to rotate when the shafts 104a/104b are not rotating. The sprockets 105a/105b and the third shaft 108 may comprise similar operational and/or structural features to allow the third shaft 108 to rotate when one or more of the sprockets 105a/105b are not rotating in some embodiments or to cause the third shaft 108 to rotate only when the sprockets 105a/105b are rotating in other embodiments.

FIG. 4A is a diagram illustrating an example embodiment of the apparatus 100 implemented with multiple wheels of a vehicle. As shown in FIG. 4A, the apparatus 100 may comprise a first roller 102a rotatably couplable to a first wheel 101a of a vehicle, a second roller 102b rotatably couplable to a second wheel 101b of a vehicle. The components of the example embodiment shown in FIG. 4A may comprise similar structural and/or operational features as described with reference to other embodiments described herein, for example, the example embodiment of FIG. 1A. For example, rotation of the first and/or second rollers 102a/102b may cause the generator 106 to generate energy.

FIG. 4A is not meant to be limiting of the present disclosure. The apparatus 100 may comprise any number of rollers, shafts and/or generators as required and/or desired and may be implemented on any number of wheels of a vehicle as required or desired, for example on one, two, three or four wheels (for example, with reference to implementation with a car) or 18 wheels (for example, with reference to implementation with a semi-truck).

Figure 4B:
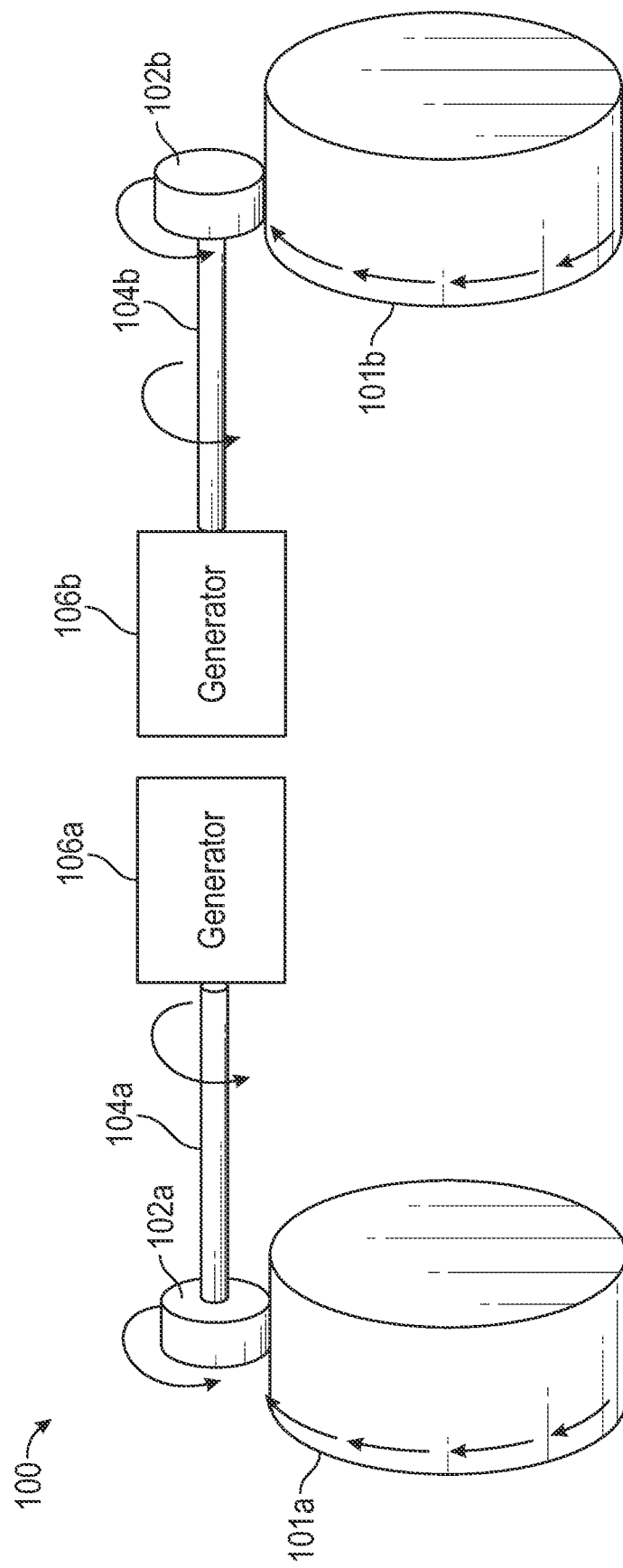

FIG. 4B is a diagram illustrating an example embodiment of the apparatus 100 implemented with multiple wheels of a vehicle and comprising multiple generators. As shown in FIG. 4B, the apparatus 100 may comprise a first and second generator 106a/106b. The components of the example embodiment shown in FIG. 4B may comprise similar structural and/or operational features as described with reference to other embodiments described herein, for example, the example embodiment of FIG. 1A. For example, rotation of the first roller 102a may cause the first generator 106a to generate energy and rotation of the second roller 102b may cause the generator 106b to generate energy. The generators 106a/106b may be in electrical communication with the vehicle and/or each other.

Figure 5A:
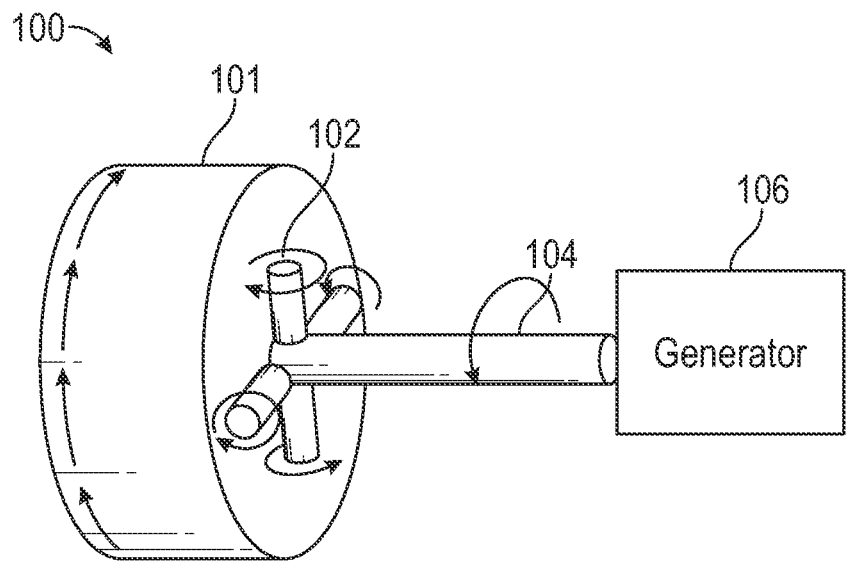
FIG. 5A is a schematic diagram illustrating an example embodiment of the apparatus comprising rollers implemented on a sidewall of a wheel of a vehicle.

FIG. 5A is a diagram illustrating an example embodiment of the apparatus 100 comprising one or more rollers rotatably couplable to a sidewall of a wheel of a vehicle. As shown in FIG. 5A, the apparatus 100 may comprise one or more rollers 102, a shaft 104 and a generator 106. Each of the one or more rollers 102 may comprise a substantially cylindrical shape and may further comprise a length, a diameter, a curved surface and a center axis as described in greater detail with reference to FIG. 2 and/or FIGS. 7A-7B. A curved surface of each of the one more rollers 102 may be in substantial physical contact with a sidewall surface of the wheel 101. The center axis of each of the one or more rollers 102 may be substantially orthogonal to a center axis of the wheel 101. Each of the one or more rollers 102 may be configured to rotate about its center axis. Each of the one or more rollers 102 may be rotatably couplable to the wheel 101 of the vehicle such that rotation of the wheel 101 causes rotation of each of the one or more rollers 102. Each of the one or more rollers 102 may rotate at a greater rotational velocity than the wheel 101.

The roller(s) 102 may be configured to be in physical contact with a sidewall of the wheel 101 at any distance away from a center axis of the wheel. For example, the roller(s) 102 may be in physical contact with a sidewall of the wheel 101 close to the center axis of the wheel or far from a center axis of the wheel. The roller(s) 102 may rotate at a greater rotational velocity when in physical contact with the sidewall of the wheel 101 far from a center axis of the wheel 101 than when in physical contact with the sidewall of the wheel 101 near a center axis of the wheel 101.

With continued reference to FIG. 5A, the roller(s) 102 may be rotatably coupled to a shaft 104 such that rotation of the roller(s) 102 causes rotation of the shaft 104. The roller 102 may be coupled (e.g., rotatably coupled) to the shaft 104 for example via one or more coupling devices as required or desired such as gears, sprockets, chains, belts, pulleys and the like. The shaft 104 may rotate about an axis that is substantially orthogonal to the axes of the roller(s) 102. In some embodiments, the shaft 104 may be fixedly rotatably coupled to the roller(s) 102 such that the shaft 104 can only rotate when the roller(s) 102 rotate. In some embodiments, the shaft 104 may be configured to rotate when one or more of the roller(s) 102 is not rotating, for example, after a roller 102 discontinues rotating, the shaft 104 may continue to rotate, for example due to rotational inertia. For example, the roller(s) 102 and/or shaft 104 may comprise a one-way ratchet device that causes the shaft 104 to rotate when the roller(s) 102 rotate and allows the shaft 104 to continue to rotate even when one of the roller(s) 102 is not rotating (e.g., has stopped rotating). In some embodiments, the shaft 104 may be configured to not rotate when one or more of the roller(s) 102 are rotating. For example, in a disengaged state, as discussed in greater detail herein, the roller(s) 102 may rotate in response to rotation of a vehicle wheel but may not cause rotation of the shaft 104 to generate energy at the generator 106.

The shaft 104 may be operably coupled to a generator 106. The generator 106 may be configured to generate energy (e.g., an electrical output) in response to mechanical movement such as the rotation of the shaft 104. The generator 106 may be electrically coupled to the vehicle and may provide generated energy to the vehicle, for example to a motor of the vehicle and/or to an energy storage device of the vehicle that includes one or more batteries and/or capacitors (e.g., ultracapacitors) or one or more hypercapacitors.

Figure 5B:
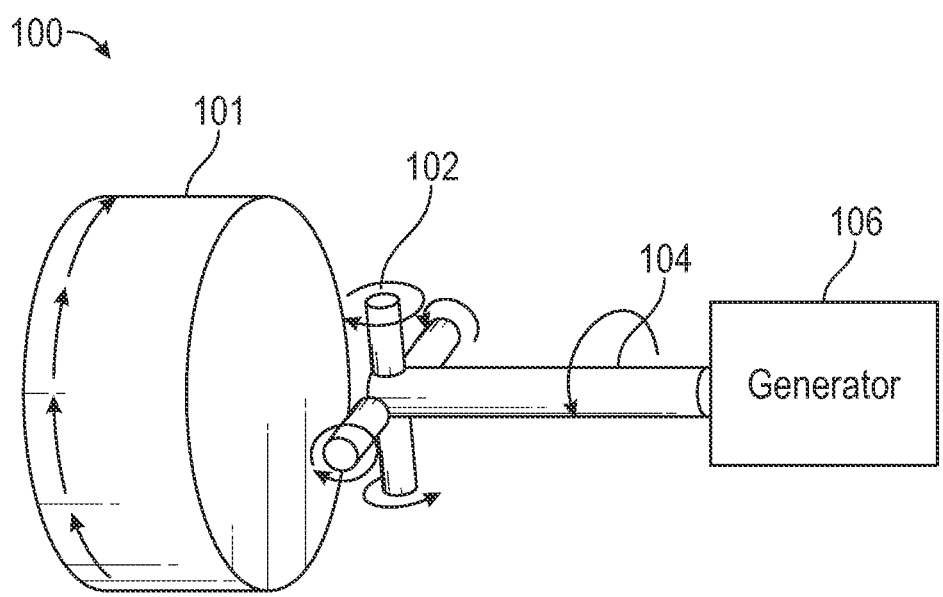
FIG. 5B is a schematic diagram illustrating an example embodiment of the apparatus of FIG. 5A in a disengaged state.

FIG. 5B is a diagram illustrating an example embodiment of the apparatus 100 comprising one or more rollers that are removably coupled to a sidewall of a wheel of a vehicle. The apparatus 100 may exist in one of (1) an engaged state or (2) a disengaged state. In the engaged state, the roller(s) 102 may be in physical contact with the wheel 101 (e.g., rotatably coupled to a sidewall of the wheel 101) in which the rotation of the wheel 101 causes the roller(s) 102 to rotate. In some embodiments, in the disengaged state, the roller(s) 102 may not be in physical contact with the wheel 101 such that rotation of the wheel 101 does not cause the roller(s) 102 to rotate. In some embodiments, in the disengaged state, the roller(s) 102 may be in physical contact with the wheel 101 such that rotation of the wheel 101 causes the roller(s) 102 to rotate but the roller(s) 102 may not be rotatably coupled to the shaft 104 such that rotation of the roller(s) 102 does not cause the shaft 104 (or other similar component) to rotate to cause generation of energy at the generator 106.

FIG. 5B shows roller(s) 102 in an example disengaged state such that the roller(s) 102 are not in physical contact with the wheel 101 and will not rotate in response to a rotation of the wheel 101. The roller(s) 102 may transition between the engaged and the disengaged states. In some embodiments, the roller(s) 102 may transition between the engaged and the disengaged states automatically, for example, based at least in part on an energy demand of the vehicle (e.g., an energy demand of a motor of the vehicle) and/or a rotational velocity of the wheel 101. In some embodiments, the roller(s) 102 may transition between the engaged and the disengaged states in response to a user input, such as a driver of the vehicle toggling a user input device such as a button, switch or lever.

Figure 6A:
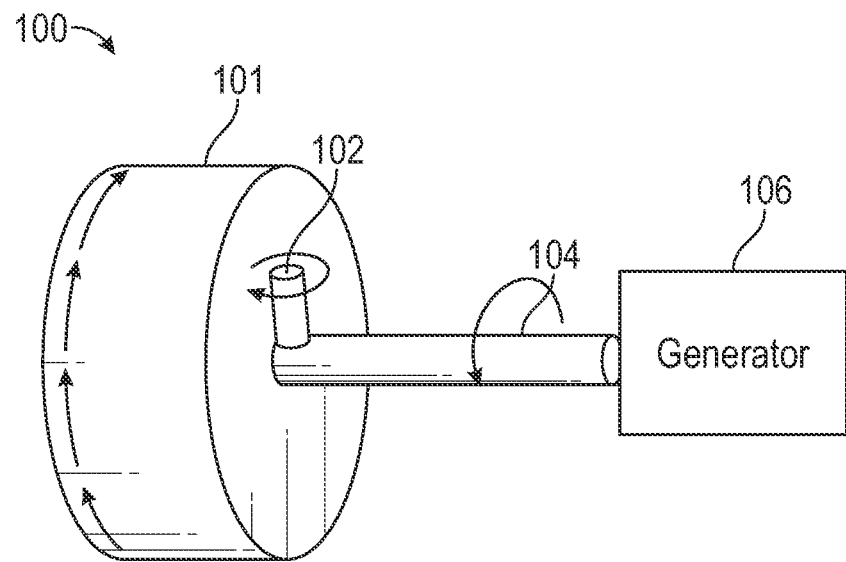
FIGS. 6A-6B are schematic diagrams illustrating example embodiments of the apparatus comprising a shaft coupled to various portions of a roller.

FIG. 6A is a diagram illustrating an example embodiment of the apparatus 100 comprising a roller rotatably couplable to a sidewall of a wheel of a vehicle. As shown in FIG. 6A, the apparatus 100 may comprise a single roller 102 which may comprise similar structural and/or operational features as described with reference to other embodiments described herein, for example, the example embodiments of FIG. 1A and/or FIG. 5A.

Figure 6B:
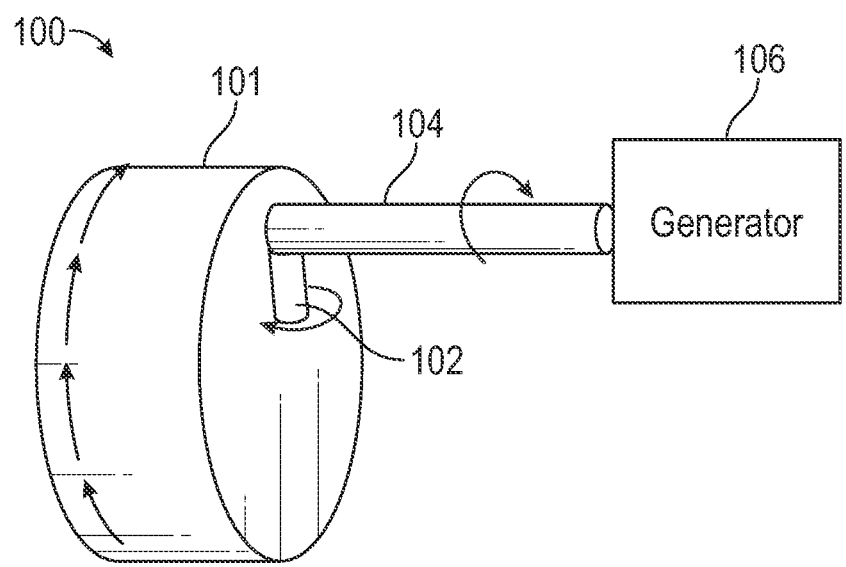

FIG. 6B is a diagram illustrating an example embodiment of the apparatus 100 comprising a roller. As shown in FIG.

6B, the apparatus 100 may comprise a single roller 102 which may comprise similar structural and/or operational features as described with reference to other embodiments described herein, for example, the example embodiments of FIG. 1A and/or FIG. 5A. As shown in FIG. 6B, the shaft 104 may be rotatably coupled to either end of the roller 102. In some embodiments, a shaft may be rotatably coupled at both ends of a roller 102.

Figure 6C:
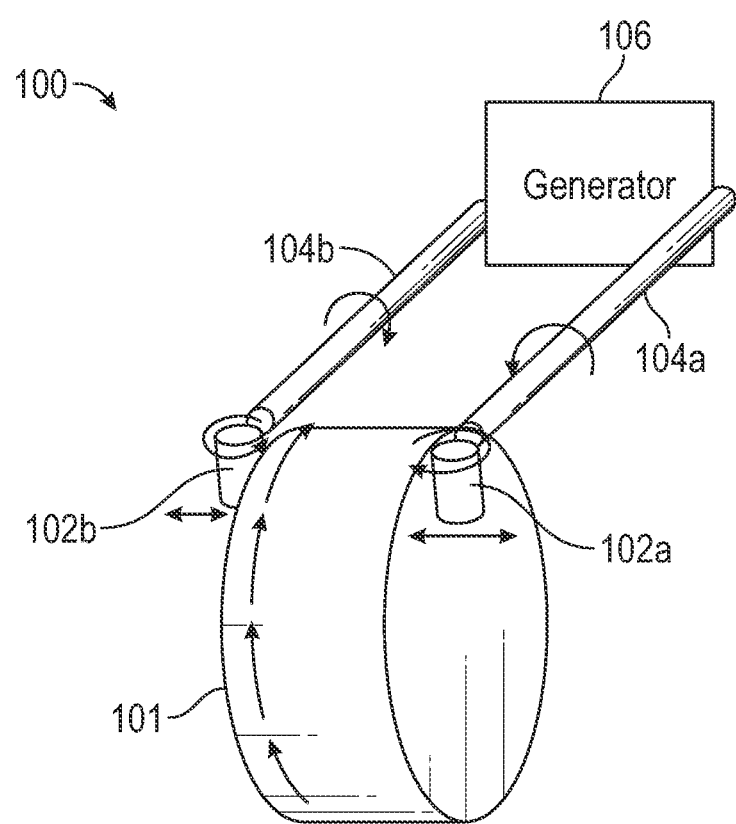
FIG. 6C is a schematic diagram illustrating an example embodiment of the apparatus on both sides of a wheel.

FIG. 6C is a diagram illustrating an example embodiment of the apparatus 100. As shown in FIG. 6C, the apparatus 100 may comprise a roller 102*a* on one side of a wheel 101 and a roller 102*b* on an opposite side of the wheel 101. The rollers 102*a*, 102*b* can be configured to be rotatably couplable to a sidewall portion of the wheel 101 and rotate in response to a rotation of the wheel 101 as described herein. The apparatus 100 may exist in one of (1) an engaged state or (2) a disengaged state and transition between the two states as discussed herein, for example by changing a physical location of the rollers 102*a*, 102*b* to physically contact or not physically contact the wheel 101.

The example embodiment of FIG. 6C can be implemented in a vehicle, for example, in conjunction with a braking system of the vehicle. For example, a braking system of a vehicle may comprise a brake pad on one side of wheel and a brake pad on an opposite side of the wheel. The brake pads may normally exist in a state wherein the brake pads are not in physical contact with the wheel. An operator of the vehicle may cause each brake pad to physically contact their respective sides of the wheel to cause friction on the sidewall of the wheel to decelerate the rotation of the wheel. As an example, the apparatus may be implemented with a brake system such that the apparatus may normally exist in a disengaged state wherein the rollers 102*a*, 102*b* are not in physical contact with the wheel 101 and the brake pads are not in physical contact with the wheel 101. When braking is desired, and the brake pads are caused to contact the wheel 101, the rollers 102*a*, 102*b* may also contact the wheel 101 in an engaged state and thereby rotate in response to a rotation of the wheel 101.

In some implementations, in the engaged state, the rollers 102*a*, 102*b* may apply a friction force to the wheel 101 to decelerate the wheel 101. In some implementations, the apparatus 100 may replace a braking system otherwise employed by the vehicle, such that when braking is desired, the rollers 102*a*, 102*b* of the apparatus transition to an engaged state thereby applying friction to the wheel 101 to decelerate the rotation of wheel 101 while simultaneously rotating in response to a rotation of the wheel 101 to generate energy at the generator 106 until the wheel 101 stops rotating.

The rotational inertia of the rollers 102 in the example embodiment of FIG. 6C and other examples herein can be changed for example increased or decreased. Increasing the rotational inertia of the rollers can cause more or less friction to be applied to the wheel 101 and also cause more or less energy to be generated at the generator 106. For example, more energy would be required to rotate a roller 102 with a high rotational inertia than would be required to rotate a roller 102 with less rotational inertia. Thus, a roller 102 with high rotational inertia could more quickly decelerate the rotation of the wheel 101 while simultaneously causing more energy to be generated at the generator 106 than a roller with lower rotational inertia. For example, when acceleration or a constant speed of the vehicle is desired, the rotational inertia of the roller(s) 102 may be low to apply less friction to the wheel 101 (which may thereby cause less energy to be generated at the generator 106) and when deceleration of the vehicle is desired (e.g., stopping), the rotational inertia of the roller(s) 102 may be high to apply more friction to the wheel 101 (which may thereby cause more energy to be generated at the generator 106). Thus, for any given desired mode of operation of the vehicle (e.g., acceleration, deceleration) a maximum energy may be generated at the generator 106 by changing a rotational inertia of the rollers 102.

In some implementations, the rotational inertia of the rollers 102 can change automatically for example in response to an energy demand of the motor of the vehicle, a rotational velocity of the wheel, and/or desired braking etc. In some implementations, the rotational inertia of the rollers can change in response to a manual user input. The rotational inertia of the roller 102 can be changed by changing a state of the roller 102, the shaft 104 (or other coupling device), and/or changing a state of the generator 106.

Figure 7A:
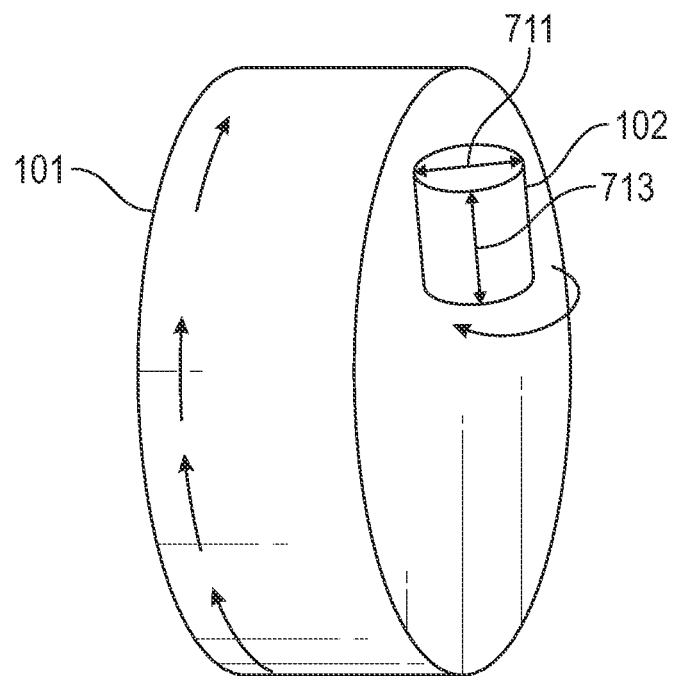
FIG. 7A-7B is a schematic diagram illustrating various sizes of a roller of the apparatus implemented on a sidewall of a wheel.

FIG. 7A is a diagram illustrating an example embodiment of a roller. As shown in FIG. 2, the roller 102 may comprise a length 713 and a diameter 711. The roller 102 may have any length 713 such as is required or desired. The roller 102 may have any diameter 711 such as is required or desired. The diameter 711 of the roller 102 may be less than the diameter of the wheel 101 such that the roller 102 rotates at a greater rotational velocity than the wheel 101 in response to a rotation of the wheel 101. In some embodiments comprising multiple rollers, one, some or each of the multiple rollers may have a length and/or diameter that is different than the lengths and/or diameters of the other rollers.

Figure 7B:
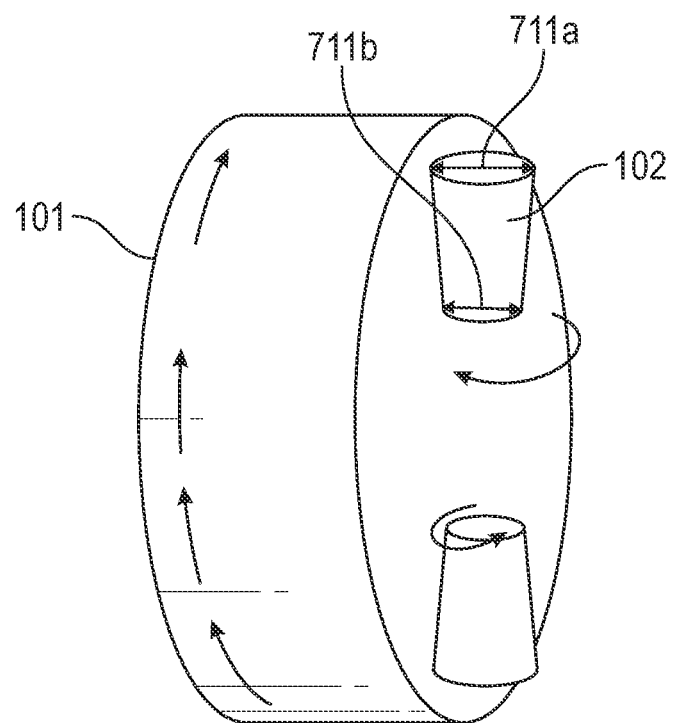

FIG. 7B is a diagram illustrating an example embodiment of a roller. As shown in FIG. 7B, the roller 102 may comprise a diameter that varies in size along a length of the roller 102. For example, one end of the roller 102 may comprise a diameter 711*a* of a first size and the other end of the roller 102 may comprise a diameter 711*b* of a second size that is different than the diameter 711*a*. A roller 102 having a diameter that varies in size along a length of the roller 102 may facilitate the rotation of the roller 102 in response to a rotation of the wheel 101.

Figure 7C:
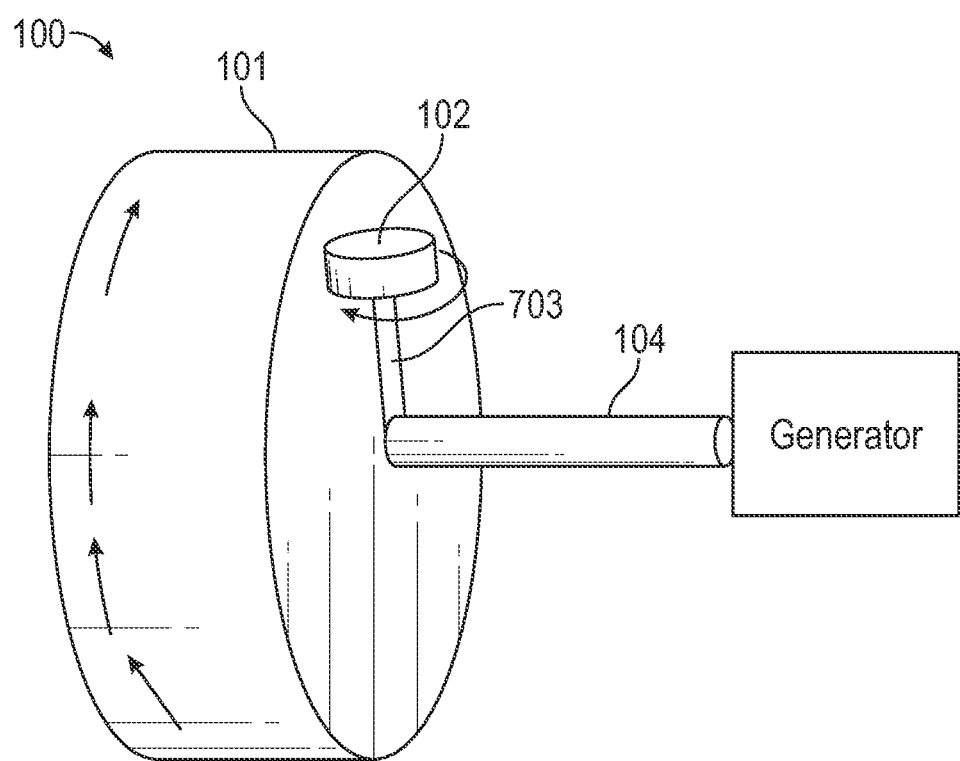
FIG. 7C is a schematic diagram illustrating an example embodiment of a roller of the apparatus coupled to a shaft of the apparatus.

FIG. 7C is a diagram illustrating an example embodiment of the apparatus 100. As shown in FIG. 7C, the apparatus 100 may comprise a roller shaft 703 rotatably coupled to the roller 102 and the shaft 104. The roller shaft 703 may not be in physical contact with the wheel 103. The roller shaft 703 may be any length to allow the roller 102 to be in contact with a sidewall of the wheel 101 at any distance away from a center axis of the wheel 101.

FIG. 8A is a diagram illustrating an example embodiment of the apparatus 100 implemented with multiple wheels of a vehicle. As shown in FIG. 8A, the apparatus 100 may comprise one or more first rollers 102*a* rotatably couplable to a first wheel 101*a* of a vehicle and one or more second rollers (not shown) rotatably couplable to a second wheel 101*b* of the vehicle. The components of the example embodiment shown in FIG. 4A may comprise similar structural and/or operational features as described with reference to other embodiments described herein, for example, the example embodiment of FIG. 5A. For example, rotation of the one or more first rollers 102*a* and/or rotation of the one or more second rollers (not shown) may cause the generator 106 to generate energy.

FIG. 8A is not meant to be limiting of the present disclosure. The apparatus 100 may comprise any number of rollers, shafts and/or generators as required and/or desired and may be implemented on any number of wheels of a vehicle as required or desired, for example on one, two, three or four wheels (for example with reference to implementation with a car) or 18 wheels (for example with reference to implementation with a semi-truck).

Figure 8B:
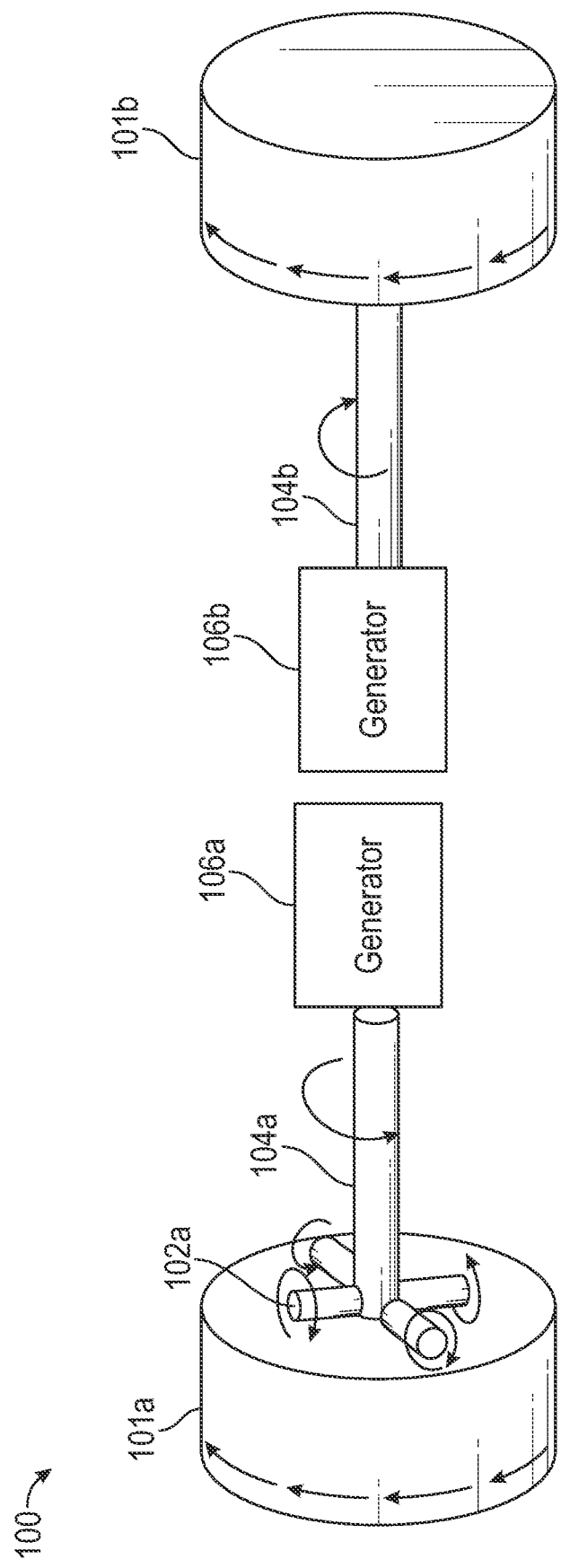

FIG. 8B is a diagram illustrating an example embodiment of the apparatus 100 implemented with multiple wheels of a vehicle and comprising multiple generators. As shown in FIG. 8B, the apparatus 100 may comprise a first and second generator 106a/106b. The components of the example embodiment shown in FIG. 8B may comprise similar structural and/or operational features as described with reference to other embodiments described herein, for example, the example embodiment of FIG. 5A. For example, rotation of the one or more first rollers 102a may cause the first generator 106a to generate energy and rotation of the one or more second rollers (not shown) may cause the generator 106b to generate energy. The generators 106a/106b may be in electrical communication with the vehicle and/or each other.

Figure 9:
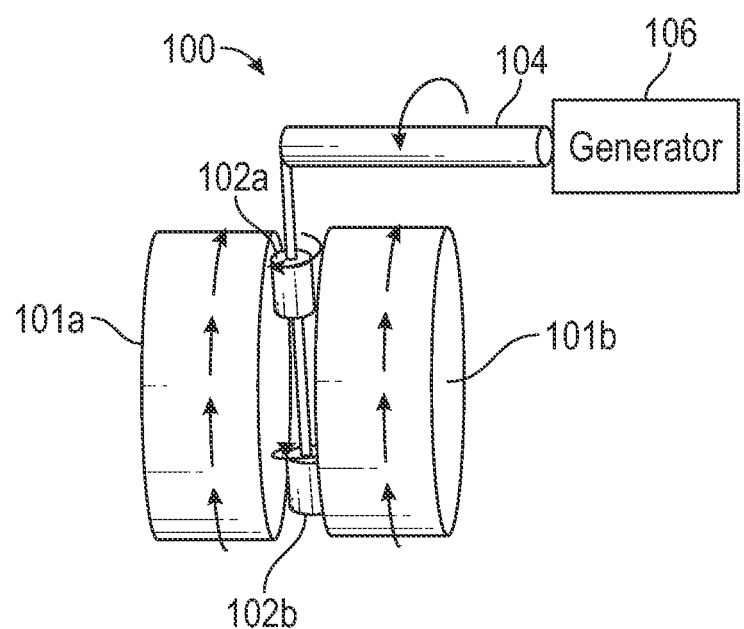
FIG. 9 is a schematic diagram illustrating an example embodiment of the apparatus comprising rollers between two adjacent wheels of a vehicle.

FIG. 9 is a diagram illustrating an example embodiment of the apparatus 100 implemented between two wheels. As shown in FIG. 9, the apparatus 100 may comprise a first roller 102a and a second roller 102b located between two wheels 101a/101b such as two adjacent wheels on a truck, van, semi-truck, tractor-trailer and the like. The first roller 102a may be in physical contact with a sidewall surface of the first wheel 101a and configured to rotate in response to a rotation of the first wheel 101a. The second roller 102b may be in physical contact with a sidewall surface of the second wheel 101b and configured to rotate in response to a rotation of the second wheel 101b. The first and second rollers 102a/102b may be coupled to each other (e.g., rotatably coupled) via one or more coupling devices such as a shaft as shown in FIG. 9 and/or any other coupling device as required or desired such as gears, sprockets, chains, belts, pulleys and the like.

The first roller 102a and/or second roller 102b may be coupled (e.g., rotatably coupled) to a shaft 104 for example via one or more coupling device such as a shaft as shown in FIG. 9 and/or any other coupling device as required or desired such as gears, sprockets, chains, belts, pulleys and the like. The shaft 104 may be configured to rotate in response to a rotation of the first roller 102a and/or second roller 102b. The shaft 104 may be operably coupled to a generator 106 and the generator 106 may be configured to generate energy (e.g., electrical output) in response to a rotation of the shaft 104 as described elsewhere herein.

FIG. 9 is given as an example and is not meant to be limiting. In some embodiments, the apparatus 100 may comprise any number of rollers, for example one roller or more than two rollers. Furthermore, the rollers 102a/102b shown in example FIG. 9 may be arranged with any orientation between their respective axes of rotation, as required or desired. For example, the respective axes of rotation of rollers 102a/102b may be substantially parallel, as shown in FIG. 9, or may be substantially orthogonal or may be oriented in any other was as required or desired. Additionally, the rollers 102a/102b may be configured to rotate independently of each other such that one roller may rotate while the other does not or may be configured to be fixedly rotatably coupled to each other such that one roller may not rotate without the other roller also rotating.

Figure 10A:
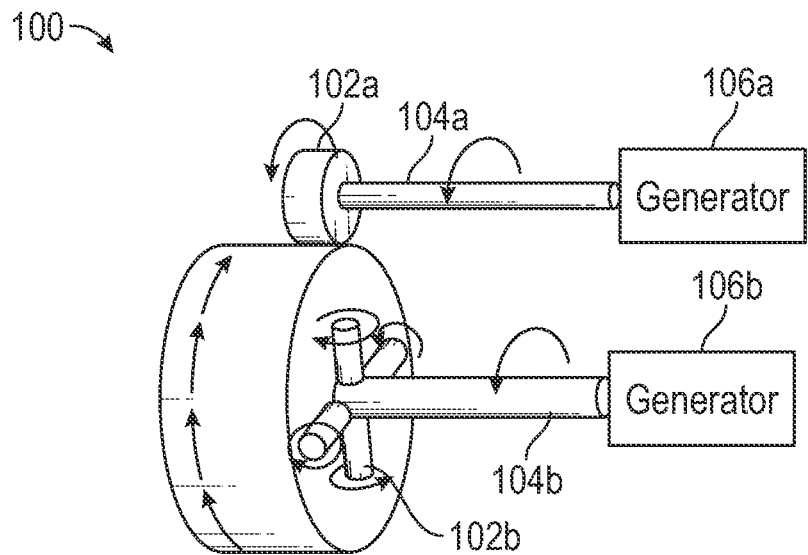
FIGS. 10A-10B are schematic diagrams illustrating example embodiments of the apparatus comprising rollers implemented on a sidewall surface and curved surface of a wheel of a vehicle.

FIG. 10A is a diagram of an example embodiment of the apparatus 100 comprising various configurations of rollers and multiple generators. As shown in FIG. 10A, the apparatus 100 may comprise one or more first rollers 102a, a first shaft 104a, a first generator 106a and one or more second rollers 102b, a second shaft 104b and a second generator 106b. The example apparatus 100 of FIG. 10A and its various components may operate in a manner similar to that described in other example embodiments herein such as with reference to FIG. 1A and/or FIG. 5A, for example.

Figure 10B:
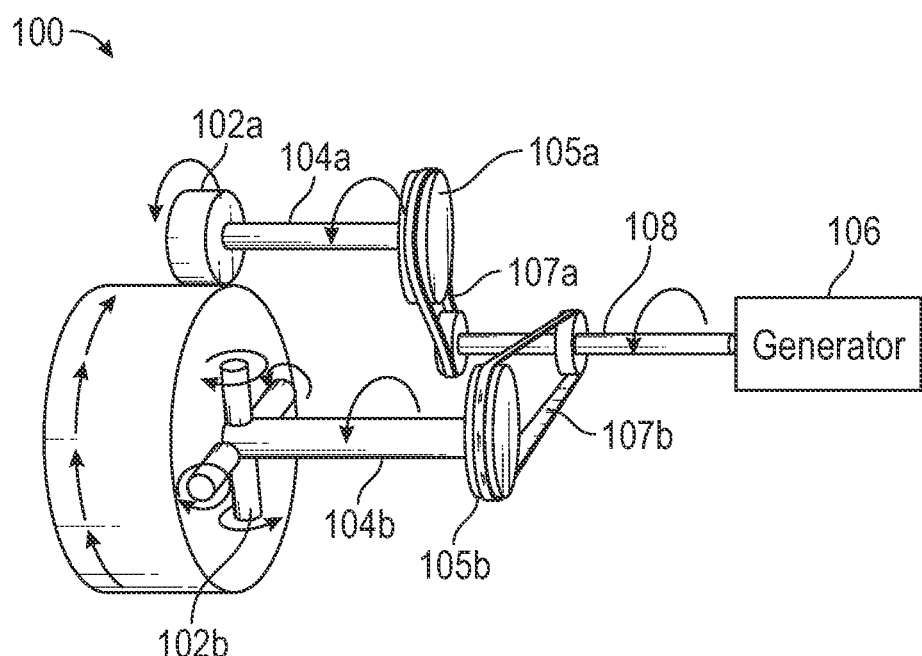

FIG. 10B is a diagram of an example embodiment of the apparatus 100 comprising various configurations of rollers and a single generator. As shown in FIG. 10B, the apparatus 100 may comprise one or more first rollers 102a, a first shaft 104a, a first sprocket 105a, a first coupling device 107a, a third shaft 108 and a generator 106. The apparatus 100 may further comprise one or more second rollers 102b, a second shaft 104b, a second sprocket 105b, and a second coupling device 107b. The example apparatus 100 of FIG. 10B and its various components may operate in a manner similar to that described in other example embodiments herein such as with reference to FIG. 1A, FIG. 5A, and/or FIG. 3B, for example.

Example Energy Generation and Storage Systems

FIG. 11A is a diagram of two generators 106a and 106b configured to be mechanically coupled to roller(s) and that convert mechanical rotation of roller(s) 102 into electrical energy outputs, in accordance with an exemplary embodiment. In some embodiments, the generators 106a and 106b may be replaced with alternators or similar electricity generating devices. The generators 106a and 106b can be mechanically coupled to roller(s) via one or more of a shaft, linkage, gear, pulley, chain, belt, sprocket or other similar mechanism or device. The example embodiment of FIG. 11A illustrates the generator 106b as mechanically coupled to roller(s) 102 via at least a chain 1101. The chain 1101 may rotate, in response to rotation of the roller(s) 102, causing a corresponding rotor of the generator 106b to rotate and causing the generator 106b to generate an electrical energy output via a cable (not shown in this figure). In some embodiments, the two generators 106a and 106b may be replaced by any number of generators 106, from a single generator to many generators. In some embodiments, the generators 106 may generate AC electricity or DC electricity, depending on the application. When the generators 106 generate AC power, an AC-to-DC converter may be used to condition and convert the generated electricity for storage. When the generators 106 generate DC power, a DC-to-DC converter may be used to condition the generated electricity for storage.

FIG. 11B is an alternate view of the two generators 106a and 106b of FIG. 11A and cabling 1103a and 1103b that couples the generators 106a and 106b to a charger (e.g., a battery and/or capacitor charger) and/or to an energy storage device such as a battery and/or capacitor. The charger may comprise one or more other components or circuits used to rectify or otherwise condition the electricity generated by the generators 106a and 106b. For example, the one or more other components or circuits may comprise one or more of a matching circuit, an inverter circuit, a conditioning circuit, a rectifying circuit, a conversion circuit, and so forth. The matching circuit may match conditions of a load to the source (for example, impedance matching, and so forth). The conversion circuit may comprise a circuit that converts an alternating current (AC) signal to a direct current (DC) signal, a DC/DC conversion circuit, a DC/AC conversion circuit and so forth. The conditioning circuit may condition a signal input into the conditioning circuit, and the rectifying circuit may rectify signals.

Additional details regarding FIGS. 11A-11B can be found in at least paragraphs [0080]-[0099] of U.S. patent application Ser. No. 17/332,824, which is hereby incorporated by reference.

Figure 12:
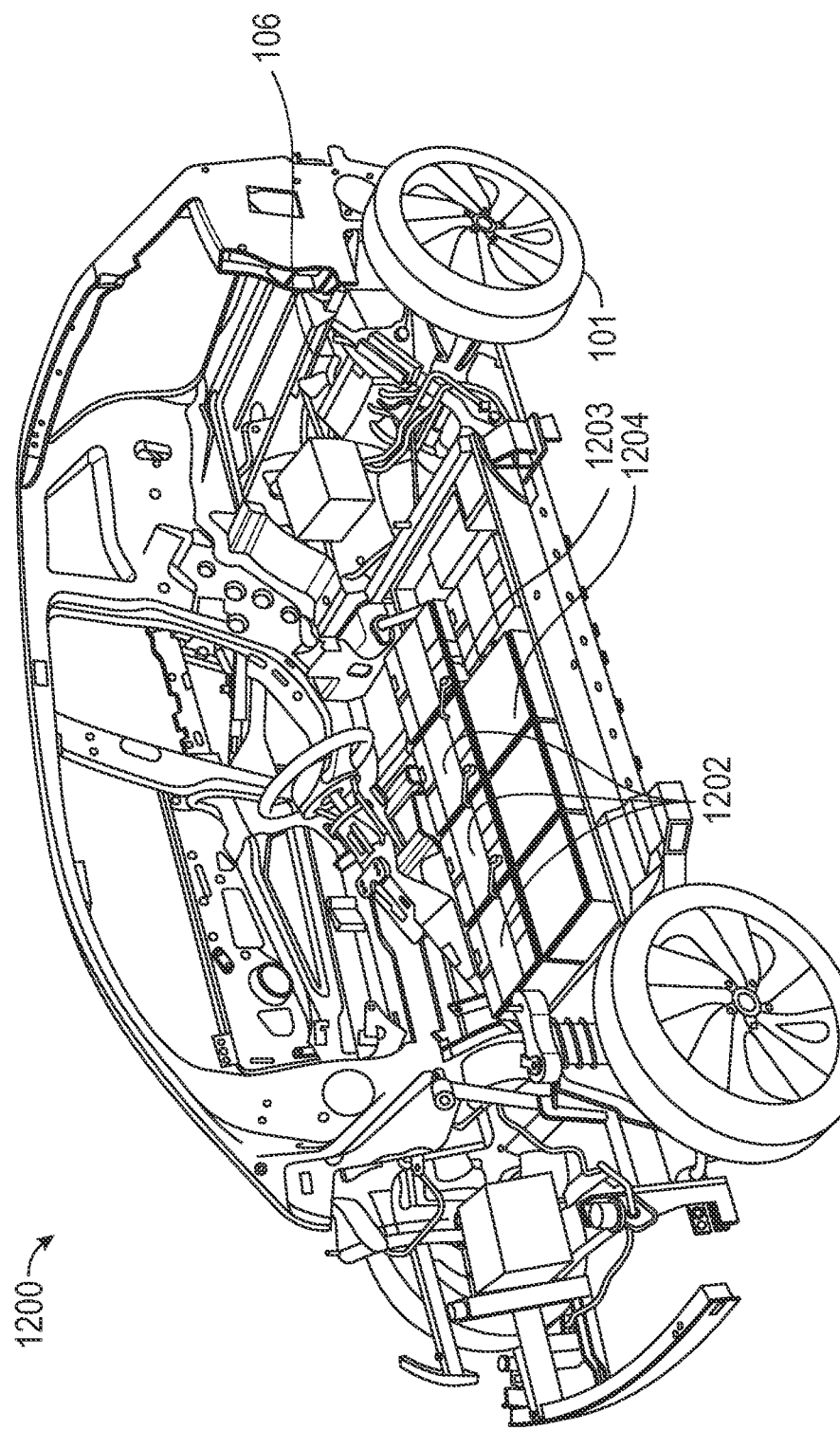
FIG. 12 is a diagram illustrating an example vehicle incorporating the apparatus, a generator and an energy storage device.

FIG. 12 is a diagram of an example vehicle 1200 incorporating an apparatus 100 comprising roller(s) 102, a generator 106, as well as an energy storage device 1203 electrically coupled with the generator 106. Energy generated at the generator 106, in response to a rotation of the roller(s) 102 can be provided to the energy storage device 1203. The energy storage device 1203 can comprise one or more batteries 1202 and/or one or more capacitor modules 1204. The energy storage device 1203 may comprise the one or more capacitor modules 1204 as a supplemental and/or intermediate energy storage device. In some embodiments, the capacitor modules 1204 are disposed alongside the one or more batteries 1202. The capacitor modules 1204 and the battery 1202 can be electrically coupled to at least a motor of the vehicle, such as an electric motor.

In some embodiments, the capacitor modules 1204 may be used in combination with the battery 1202. For example, as shown in FIG. 12, the vehicle 1200 may include one or more the capacitor modules 1204 installed alongside the battery 1202. In some embodiments, the vehicle 1200 includes a plurality of capacitor modules 1204. In some embodiments, one or more batteries 1202 are replaced with one or more capacitor modules 1204. As shown, the capacitor modules 1204 may be connected in series or in parallel with the battery 1202, dependent on the use case. For example, the capacitor modules 1204 may be connected in series or parallel with the battery 1202 when supplementing the voltage in the battery 1202 or when charging the battery 1202 and/or the capacitor modules 1204. Therefore, the battery 1202 and the capacitor modules 1204 may provide voltage support to each other. As such, the capacitor modules 1204 may provide supplemental energy when the battery 1202 are discharged or be used in place of the battery 1202 altogether.

Figure 13:
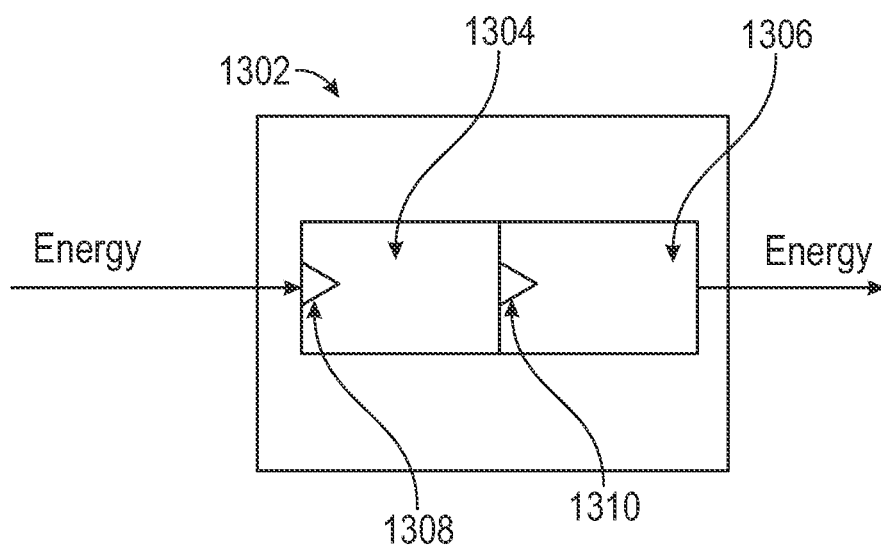
FIG. 13 is a diagram illustrating an example embodiment of a hypercapacitor as an energy storage device.

In some embodiments, the energy storage device 1203 may comprise one or more hypercapacitors. FIG. 13 schematically illustrates a diagram of an example embodiment of a hypercapacitor 1302 for storing energy (e.g., such as may be used in an electric vehicle), which may also be referred to as a hypercapacitor energy storage system or device. As shown, the hypercapacitor 1302 may comprise or consist essentially of an ultracapacitor portion 1304, an energy retainer portion 1306, one or more inbound diodes 1308, and one or more outbound diodes 1310. In some embodiments, the hypercapacitor 1302 may not comprise the inbound diode 1308 and/or the outbound diode 1310.

The ultracapacitor portion 1304 may be electrically coupled to the energy retainer portion 1306 and in some embodiments, together may comprise a single integrated unit or package (e.g., the hypercapacitor 1302). The ultracapacitor portion 1304 may provide energy to the energy retainer portion 1306 as the energy in the energy retainer portion 1306 is depleted (for example resulting from an energy demand at a load).

The electrical connection between the ultracapacitor portion 1304 and the energy retainer portion 1306 may stabilize the voltage levels of the ultracapacitor portion 1304 and prevent self-discharge as the energy retainer portion 1306 retains energy provided from the ultracapacitor portion 1304 via their electrical connection. Advantageously, stabilizing the voltage levels in the ultracapacitor portion 1304 by reducing and/or substantially eliminating self-discharge provides a superior energy device capable of storing energy (e.g., maintaining high voltage levels) for much longer than existing energy devices in widespread use today.

The ultracapacitor portion 1304 of the hypercapacitor 1302 may comprise one or more ultracapacitors and/or supercapacitors. The ultracapacitor portion 1304 may incorporate structural and operational features described in connection with any of the embodiments of the capacitor module 1204 described herein.

The energy retainer portion 1306 may comprise a device or multiple devices capable of storing energy such as a battery, a battery field and/or a capacitor. For example, in some embodiments the energy retainer portion 1306 may include a battery such as the battery 1202 described herein and may incorporate structural and operational features of the battery 1202. In some embodiments, the energy retainer portion 1306 may include a battery field such as a battery field comprising batteries 1202 such as shown in FIG. 12. In some embodiments, the energy retainer portion 1306 may comprise one or more capacitors, such as the capacitor module 1204 described herein.

Additional details regarding FIG. 13 can be found in at least paragraphs [0211]-[0246] of U.S. patent application Ser. No. 17/332,824, which is hereby incorporated by reference.

Figure 14A:
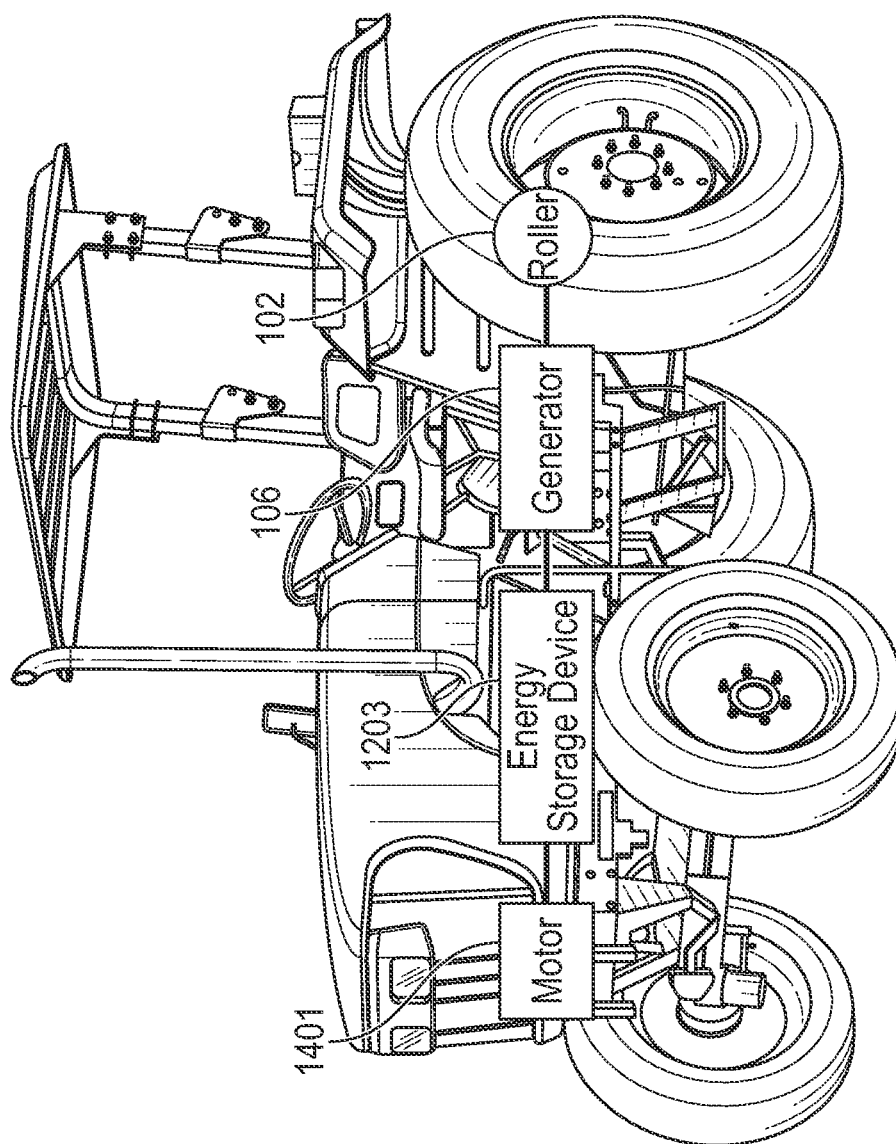
FIGS. 14A-14J illustrate example vehicles incorporating the apparatus, a generator, an energy storage device and a motor.

FIG. 14A illustrates an example farm equipment such as a tractor that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14B:
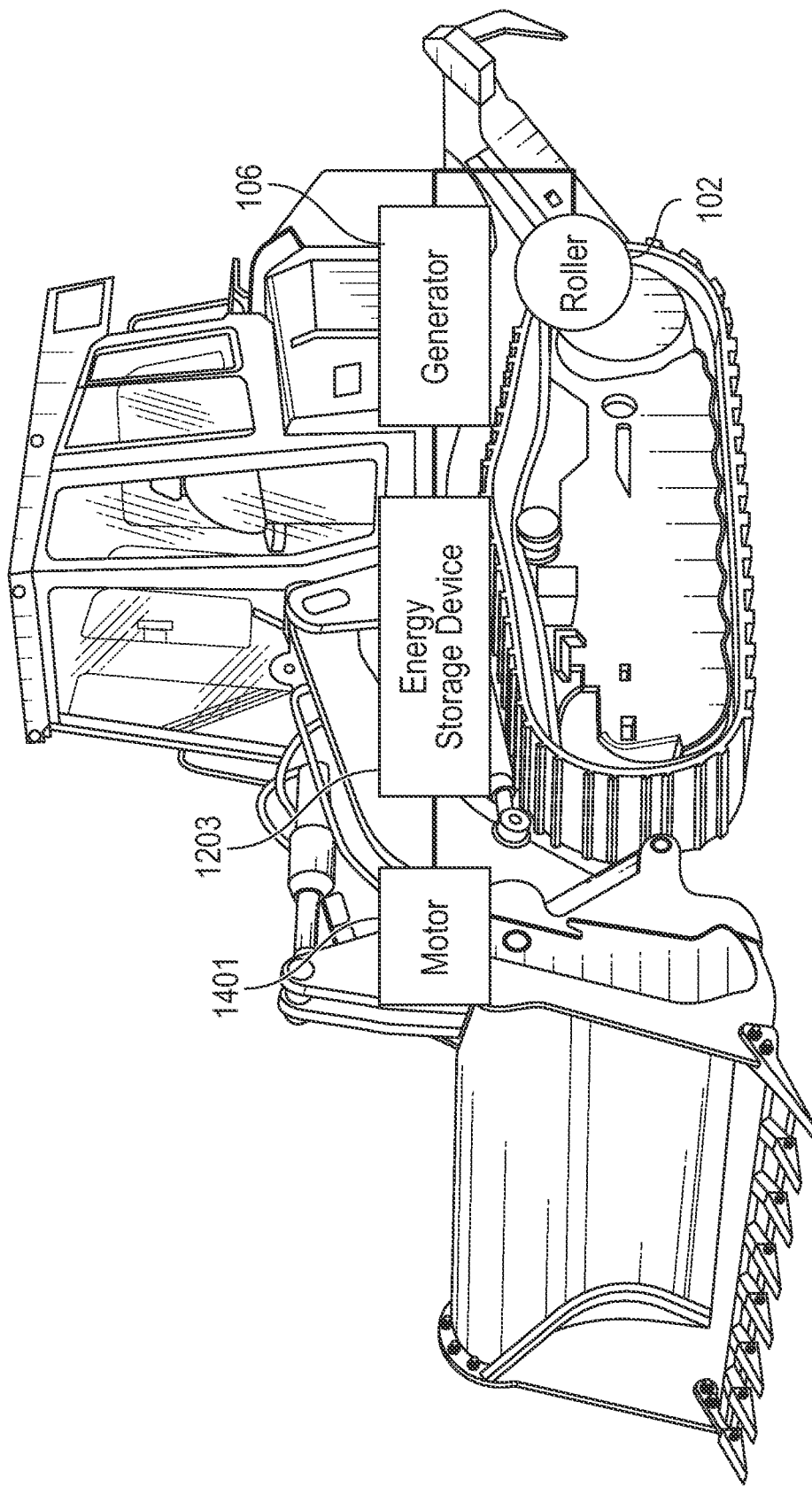

FIG. 14B illustrates an example construction equipment that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14C:
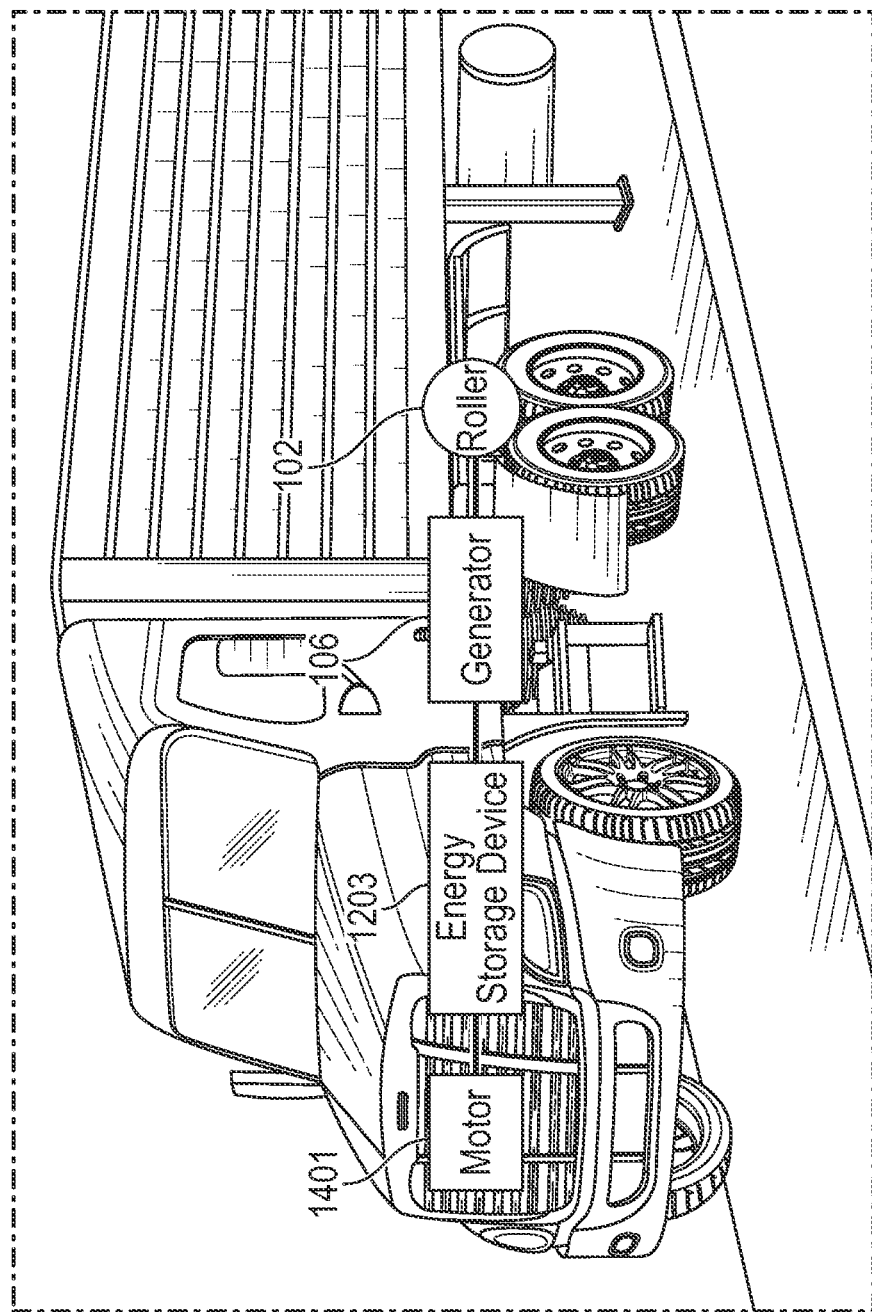

FIG. 14C illustrates an example commercial vehicle such as a tractor-trailer or semi-truck that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14D:
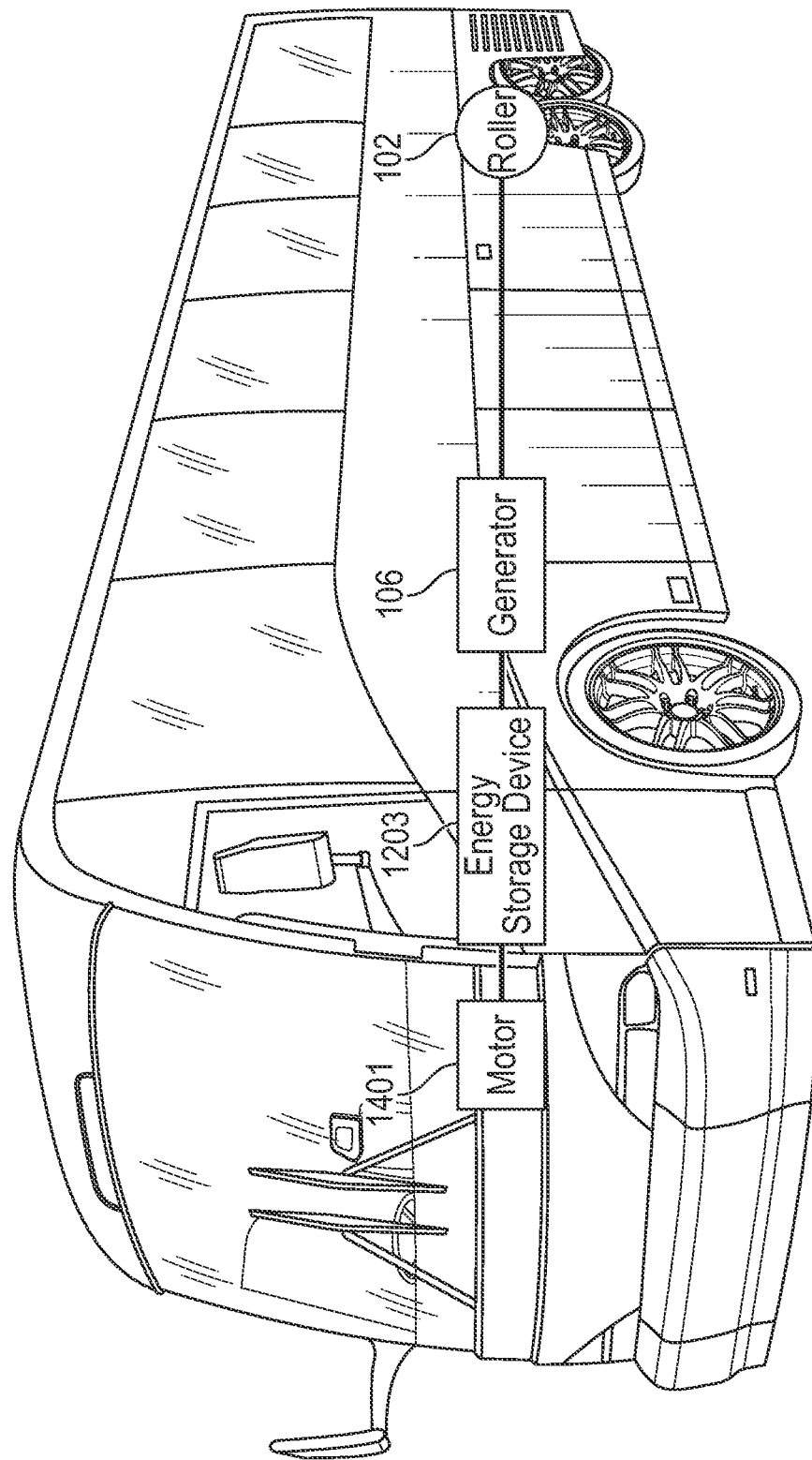

FIG. 14D illustrates an example bus that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14E:
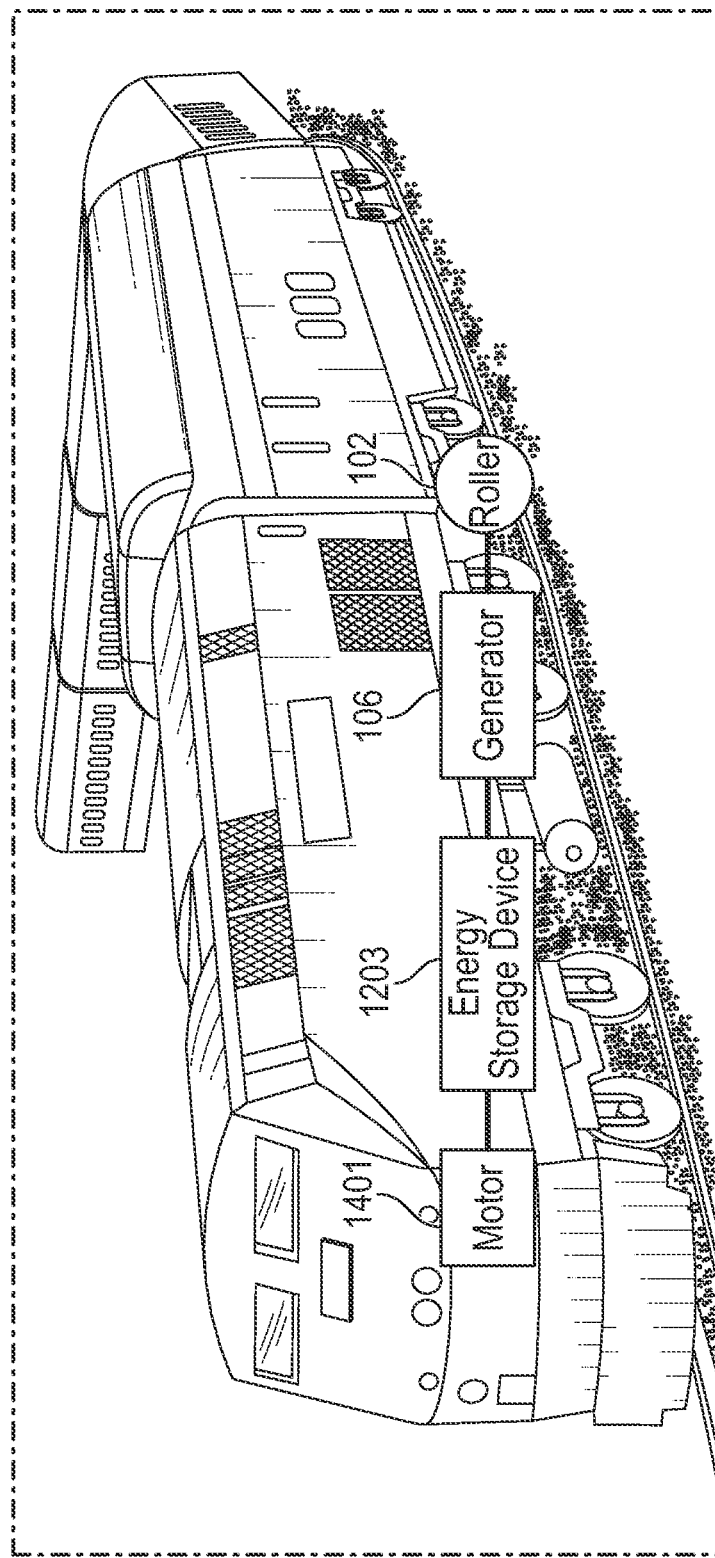

FIG. 14E illustrates an example train that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14F:
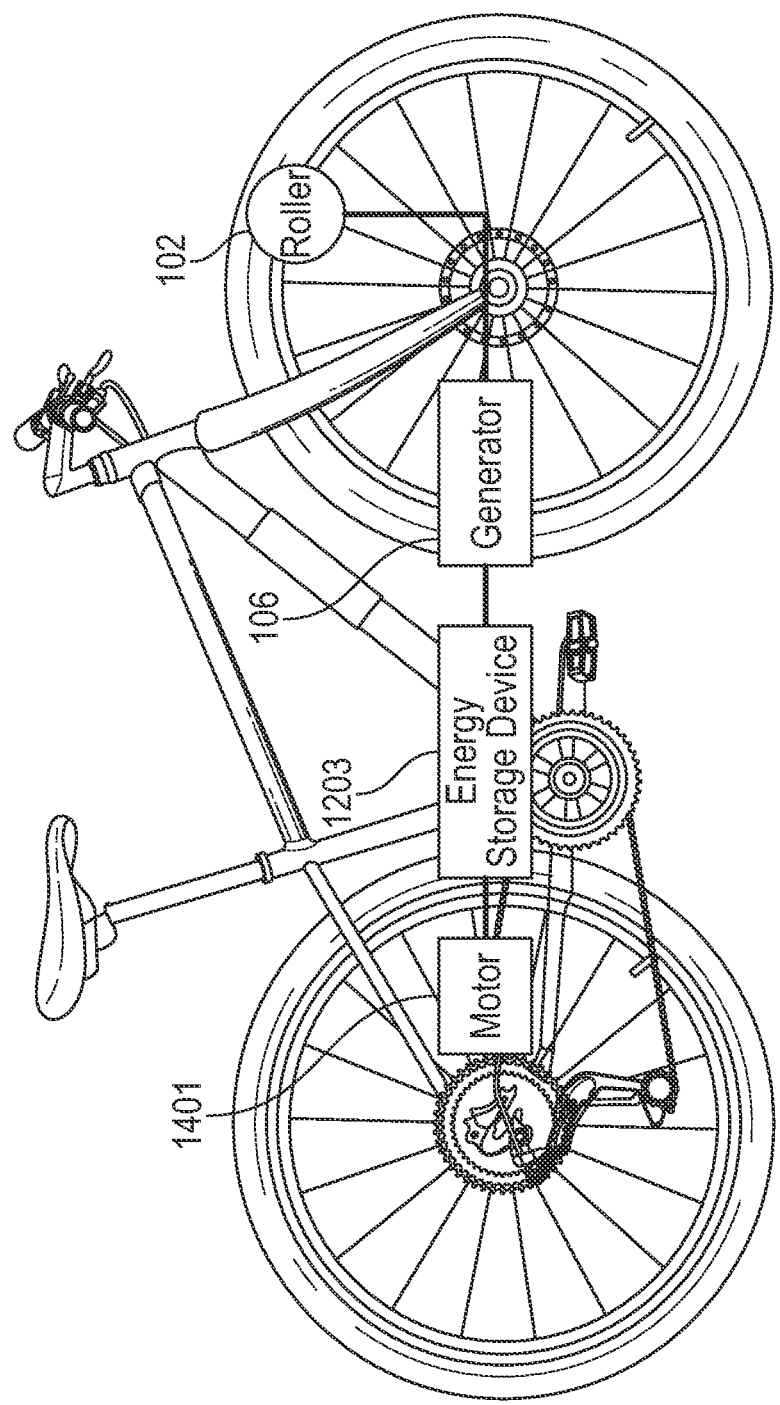

FIG. 14F illustrates an example bicycle that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14G:
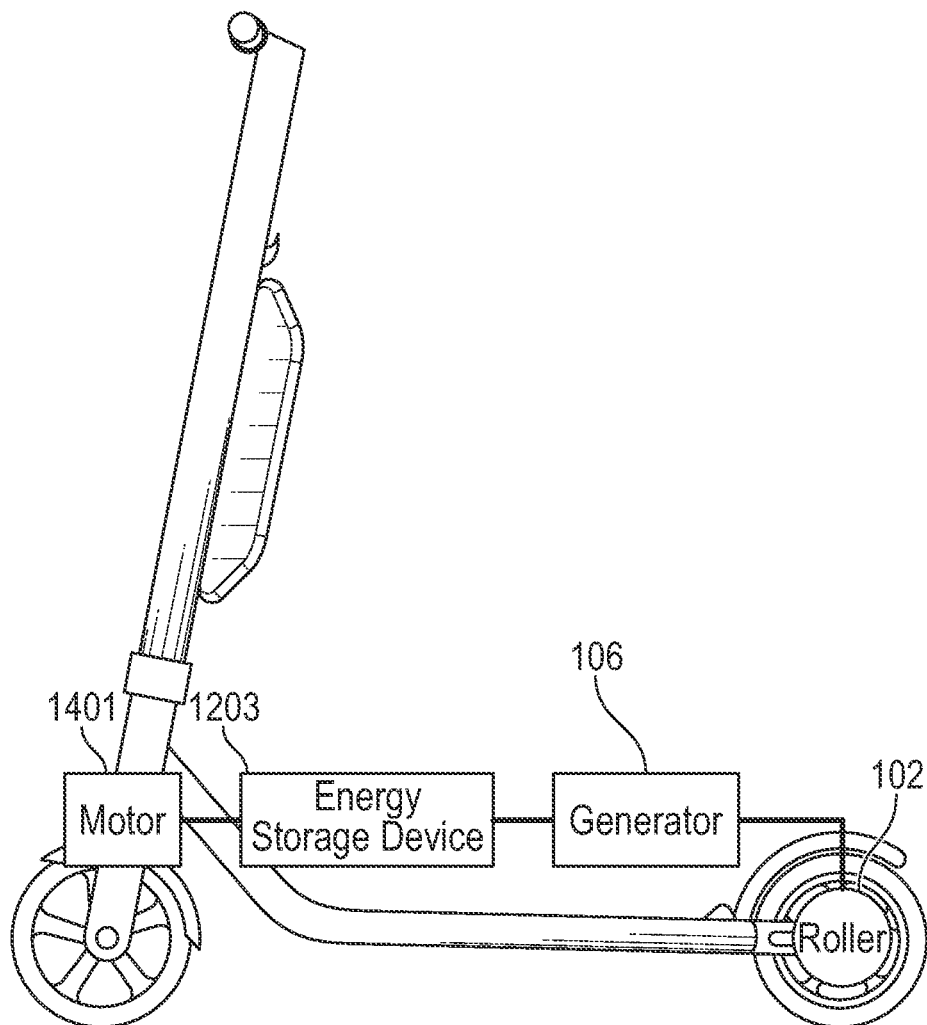
Figure 14:
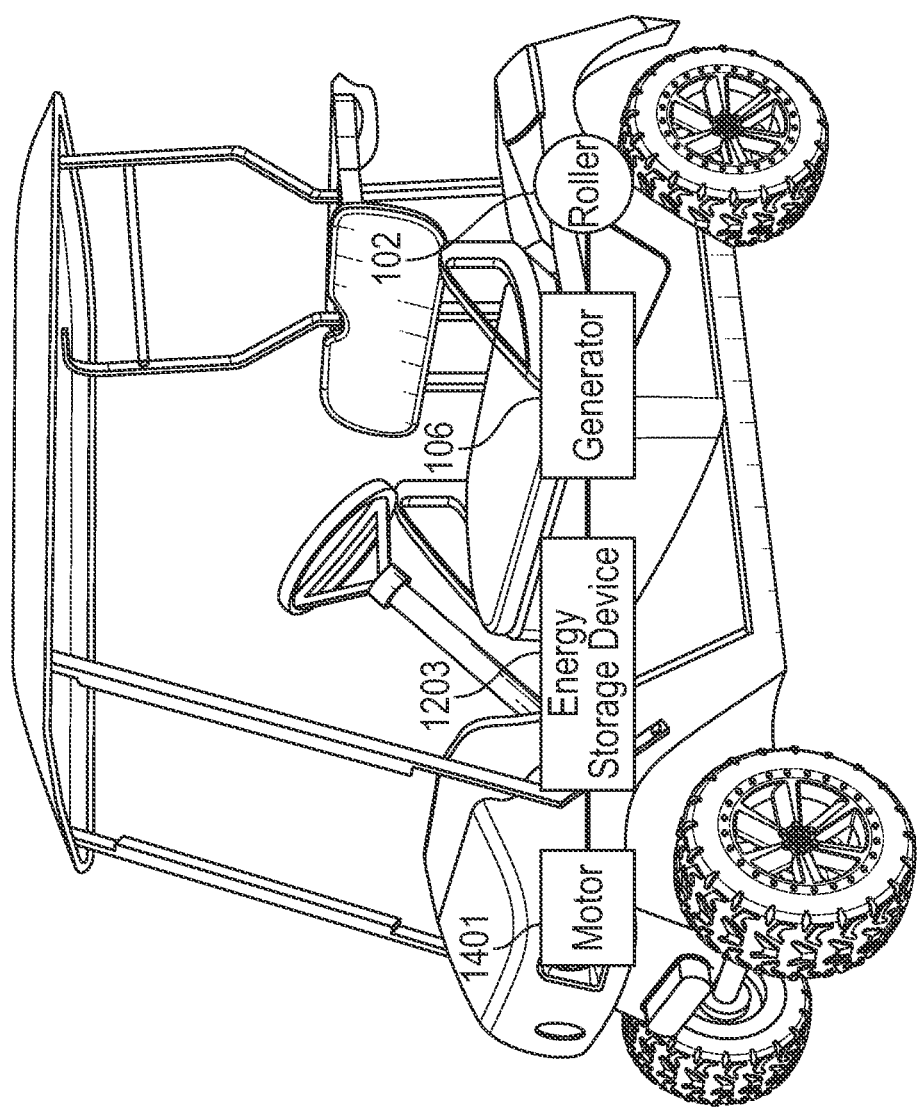

FIG. 14G illustrates an example scooter that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

FIG. 14H illustrates an example tram that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

FIG. 14I illustrates an example cart such as a golf cart that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 14J:
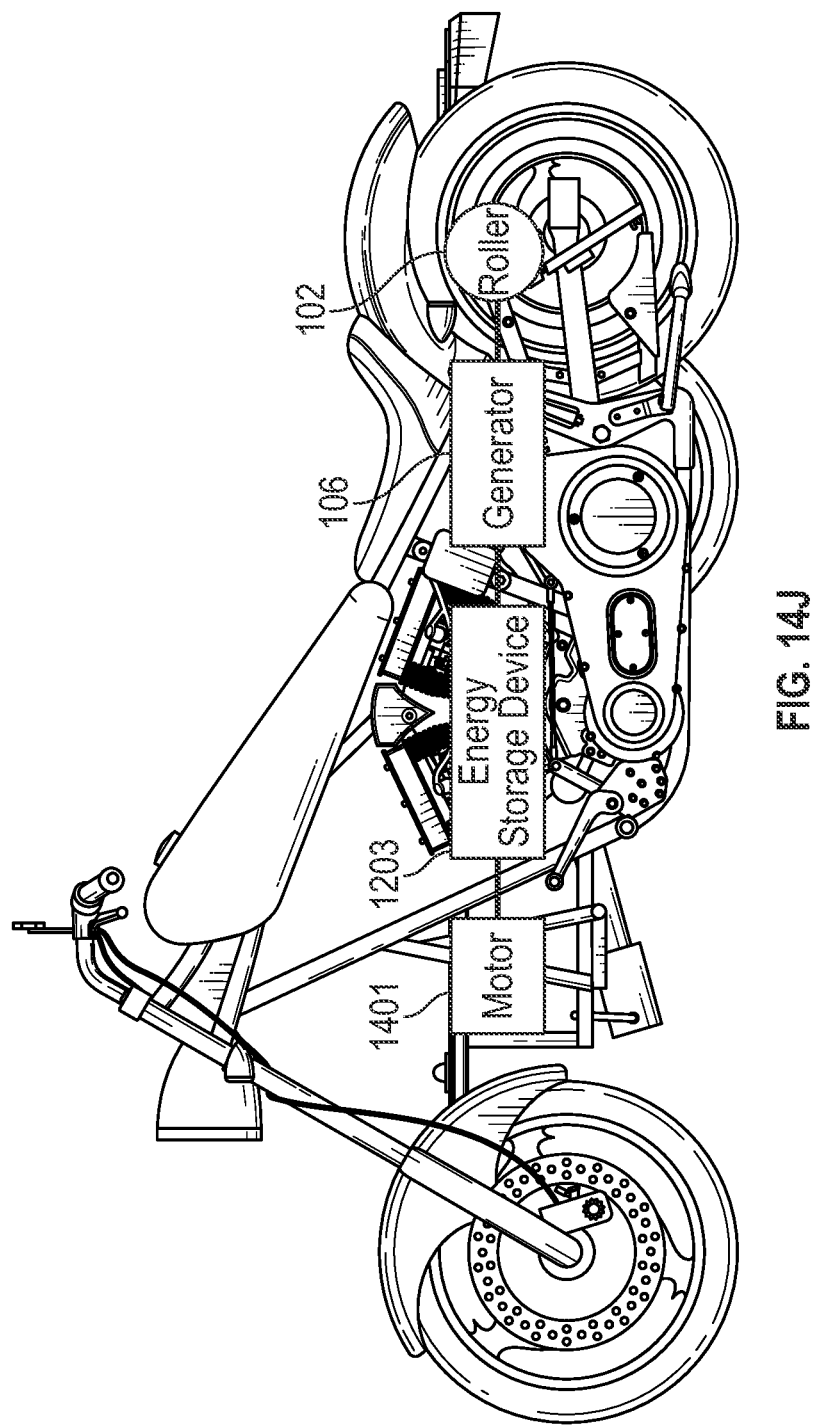

FIG. 14J illustrates an example motorcycle that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Additional Embodiments

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof

What is claimed is:

1. An apparatus for generating energy in response to a rotation of a wheel of a vehicle, the apparatus comprising:
   a roller disposed within the vehicle and configured to rotate in response to a movement or motion of the wheel;
   a shaft configured to:
      rotatably couple to the roller in an engaged state, wherein in the engaged state the shaft is configured to rotate in response to a rotation of the roller; and
      rotatably decouple from the roller in a disengaged state, wherein in the disengaged state, the roller is in substantial physical contact with the wheel and is configured to rotate in response to a movement or motion of the wheel,
      wherein the shaft is further configured to transition between the engaged state and the disengaged state; and
   a generator operably coupled to the shaft and disposed within the vehicle, wherein the generator is configured to generate an electrical output based on a rotation of the shaft.

2. The apparatus of claim 1, wherein the shaft is further configured to transition between the engaged state and the disengaged state automatically based, at least in part, in response to an energy demand of a motor of the vehicle or a rotational velocity of the wheel.

3. The apparatus of claim 1, wherein the shaft is further configured to transition between the engaged state and the disengaged state based, at least in part, in response to a user input.

4. The apparatus of claim 1, wherein the shaft is further configured to rotate in response to a rotational inertia of the shaft when the roller is not rotating.

5. The apparatus of claim 1, wherein the shaft is further configured to rotate in response to a rotational inertia of the shaft when the shaft is rotatably coupled to the roller in the engaged state.

6. The apparatus of claim 1, further comprising a one-way ratchet configured to rotatably couple the shaft to the roller in a first angular direction in the engaged state to cause the shaft to rotate in the first angular direction in response to a rotation of the roller in the first angular direction.

7. The apparatus of claim 1, wherein the generator is further configured to generate the electrical output while the vehicle is mobile.

8. The apparatus of claim 1, wherein the generator is further configured to convey the electrical output to a motor of the vehicle configured to convert electrical energy to kinetic energy to cause the wheel to rotate.

9. The apparatus of claim 1, wherein the generator is further configured to convey the electrical output to an energy storage device of the vehicle.

10. The apparatus of claim 9, wherein the energy storage device includes a capacitor.

11. The apparatus of claim 9, wherein the energy storage device includes a battery.

12. The apparatus of claim 1, wherein the roller is further configured to contact a sidewall surface of the wheel.

13. The apparatus of claim 1, wherein the roller is further configured to contact a curved surface of the wheel.

14. The apparatus of claim 1, wherein the roller is further configured to not cause the shaft to rotate in the disengaged state.

15. The apparatus of claim 3, wherein the user input comprises activation of a user input device by an operator of the vehicle.

16. A method for generating energy in response to a rotation of a wheel of a vehicle, the method comprising:
    rotating a roller in response to a movement or motion of the wheel, wherein the roller is disposed within the vehicle;
    rotatably coupling a shaft to the roller in an engaged state, wherein in the engaged state the shaft is configured to rotate in response to a rotation of the roller;
    rotatably disengaging the shaft from the roller in a disengaged state, wherein in the disengaged state, the roller is in substantial physical contact with the wheel and is configured to rotate in response to a movement or motion of the wheel;
    transitioning the shaft between the engaged state and the disengaged state; and
    generating, at a generator, an electrical output based on a rotation of the shaft, wherein the generator is disposed within the vehicle.

17. The method of claim 16, further comprising transitioning the shaft between the engaged state and the disengaged state automatically based, at least in part, in response to an energy demand of a motor of the vehicle or a rotational velocity of the wheel.

18. The method of claim 16, further comprising rotating the shaft in response to a rotational inertia of the shaft when the roller is not rotating.

19. The method of claim 16, further comprising rotating the shaft in response to a rotational inertia of the shaft when the shaft is rotatably coupled to the roller in the engaged state.

20. The method of claim 16, further comprising generating the electrical output while the vehicle is mobile.

21. The method of claim 16, further comprising conveying the electrical output to a motor of the vehicle configured to convert electrical energy to kinetic energy to cause the wheel to rotate.

22. The method of claim 16, further comprising conveying the electrical output to an energy storage device of the vehicle.

\* \* \* \* \*